US008954496B2

(12) United States Patent
Sukeno et al.

(10) Patent No.: US 8,954,496 B2
(45) Date of Patent: Feb. 10, 2015

(54) MULTI-SCREEN DISPLAY SYSTEM

(75) Inventors: Junji Sukeno, Tokyo (JP); Tomonori Fukuta, Tokyo (JP); Osamu Nasu, Tokyo (JP); Masahide Koike, Tokyo (JP); Koji Minami, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 211 days.

(21) Appl. No.: 13/818,369

(22) PCT Filed: Sep. 7, 2011

(86) PCT No.: PCT/JP2011/070341
§ 371 (c)(1),
(2), (4) Date: Feb. 22, 2013

(87) PCT Pub. No.: WO2012/077392
PCT Pub. Date: Jun. 14, 2012

(65) Prior Publication Data
US 2013/0159401 A1    Jun. 20, 2013

(30) Foreign Application Priority Data

Dec. 10, 2010   (JP) ................................. 2010-275490

(51) Int. Cl.
| G06F 15/16 | (2006.01) |
| H04L 29/08 | (2006.01) |
| H04N 21/41 | (2011.01) |
| H04N 21/43 | (2011.01) |
| H04N 21/414 | (2011.01) |
| H04N 5/64 | (2006.01) |

(52) U.S. Cl.
CPC ............ *H04L 67/10* (2013.01); *H04N 21/4122* (2013.01); *H04N 21/4307* (2013.01); *H04N 21/41415* (2013.01)

USPC ........................................... 709/203; 348/840

(58) Field of Classification Search
USPC ............ 709/203, 204, 208, 212, 223; 348/69, 348/138, 139, 194, 285, 423.1, 425.4, 493, 348/500, 513, 536, 540, 541
See application file for complete search history.

(56) References Cited

U.S. PATENT DOCUMENTS

| 4,967,268 | A | * | 10/1990 | Lipton et al. .................... 348/56 |
| 5,499,039 | A | * | 3/1996 | Mistrot ......................... 345/634 |
| 5,550,556 | A | * | 8/1996 | Wu et al. ......................... 345/14 |
| 5,751,261 | A | * | 5/1998 | Zavracky et al. ............... 345/55 |

(Continued)

FOREIGN PATENT DOCUMENTS

| JP | 10-164104 A | 6/1998 |
| JP | 2000-322039 A | 11/2000 |

(Continued)

*Primary Examiner* — Sargon Nano
(74) *Attorney, Agent, or Firm* — Birch, Stewart, Kolasch & Birch, LLP

(57) ABSTRACT

The image update timings of a plurality of display devices are adjusted by calculating, in their image reproduction/updating control means (7), the phase difference between a synchronization adjustment signal (SAS) created from synchronization adjustment data (SAD) received from the transmitting apparatus TA by a data reception means (6) and an image display control signal (HC) output to the image display means (8), and increasing or decreasing the period of the next and subsequent image display control signals (HC) according to the phase difference, thereby reducing the phase difference. Image updating in the plurality of display devices can be synchronized to within a fixed tolerance range.

20 Claims, 20 Drawing Sheets

(56) References Cited

U.S. PATENT DOCUMENTS

| | | | |
|---|---|---|---|
| 6,247,090 B1* | 6/2001 | Arai et al. | 710/9 |
| 6,628,299 B2* | 9/2003 | Kitayama | 345/635 |
| 7,119,849 B2* | 10/2006 | Yui et al. | 348/564 |
| 7,417,664 B2* | 8/2008 | Tomita | 348/43 |
| 7,428,307 B2* | 9/2008 | Hori et al. | 380/277 |
| 7,440,675 B2* | 10/2008 | Kanazawa et al. | 386/240 |
| 7,636,365 B2* | 12/2009 | Chang et al. | 370/401 |
| 2003/0023758 A1* | 1/2003 | Yoshikawa et al. | 709/247 |
| 2004/0083301 A1* | 4/2004 | Murase et al. | 709/231 |
| 2004/0119888 A1 | 6/2004 | Arai | |
| 2004/0165087 A1* | 8/2004 | Harada | 348/239 |
| 2004/0165229 A1* | 8/2004 | Nagel | 358/486 |
| 2004/0254763 A1* | 12/2004 | Sakai et al. | 702/184 |
| 2005/0093982 A1 | 5/2005 | Kuroki | |
| 2006/0290817 A1* | 12/2006 | Yui et al. | 348/564 |
| 2008/0002058 A1* | 1/2008 | Kawana et al. | 348/537 |
| 2008/0012954 A1* | 1/2008 | Sasaki et al. | 348/222.1 |
| 2009/0222572 A1* | 9/2009 | Fujihara | 709/232 |
| 2010/0194857 A1* | 8/2010 | Mentz et al. | 348/43 |
| 2012/0050613 A1* | 3/2012 | Halna Du Fretay et al. | 348/513 |

FOREIGN PATENT DOCUMENTS

| | | |
|---|---|---|
| JP | 2004-180113 A | 6/2004 |
| JP | 2005-136868 A | 5/2005 |
| JP | 2005-300845 A | 10/2005 |
| JP | 3704121 B2 | 10/2005 |
| JP | 2008-96756 A | 4/2008 |
| JP | 2008-197383 A | 8/2008 |
| JP | 2010-226240 A | 10/2010 |

* cited by examiner

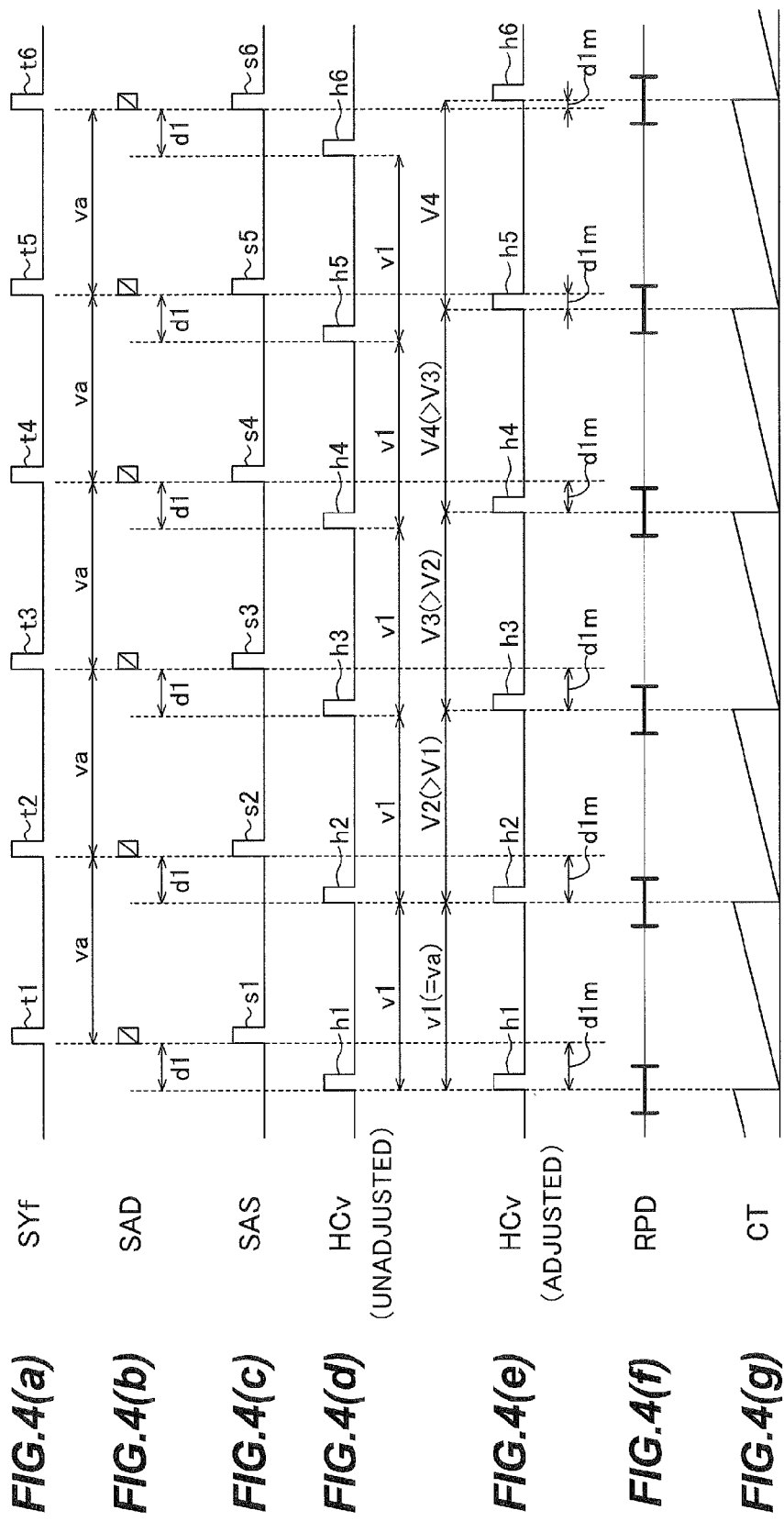

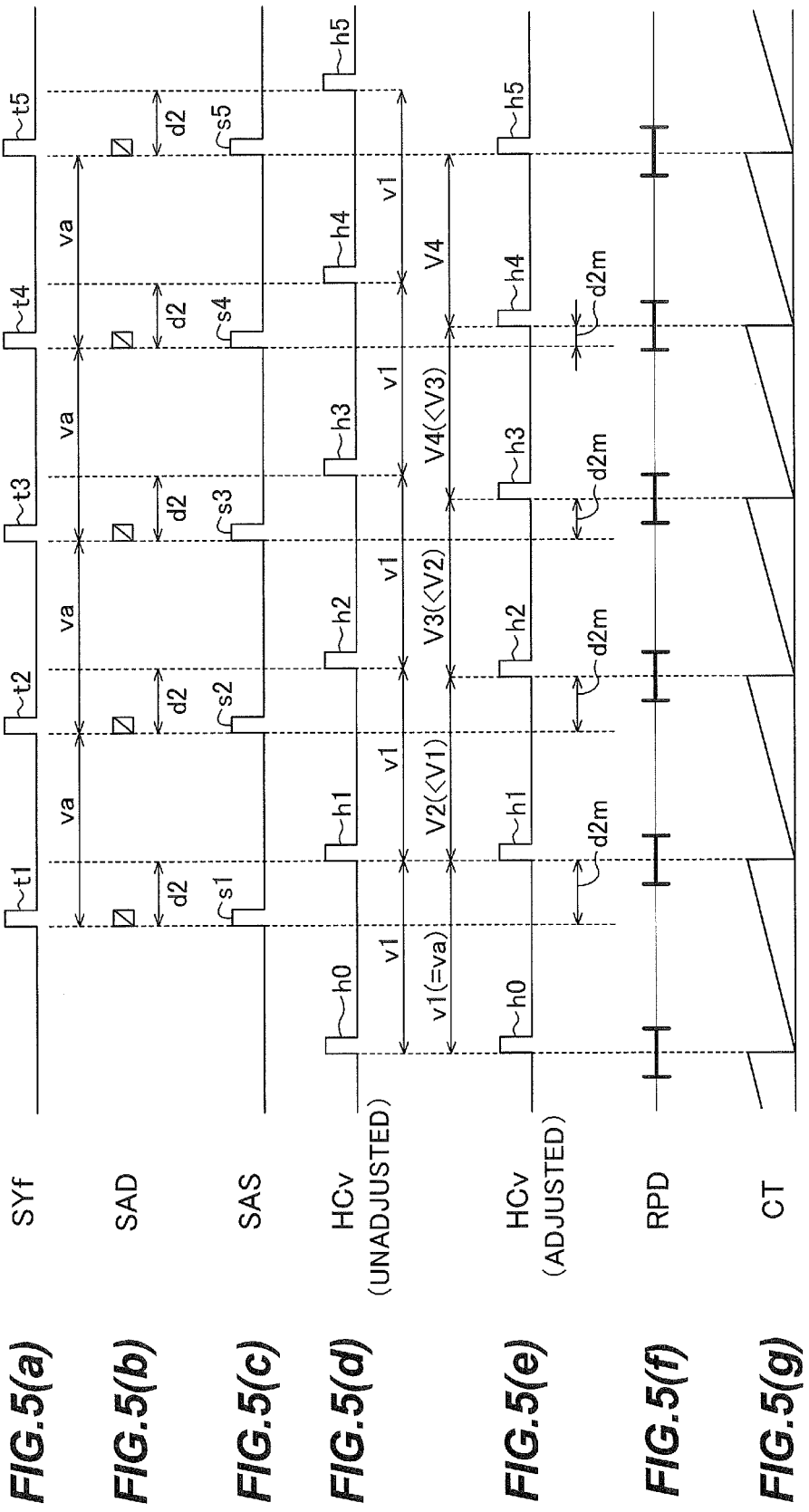

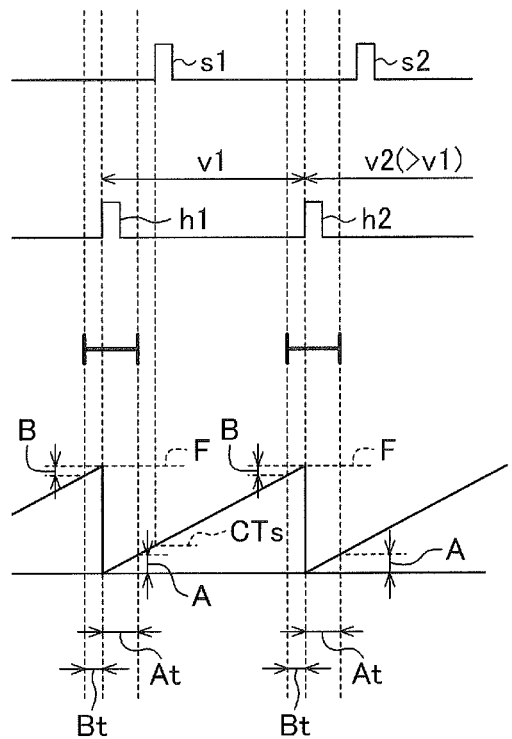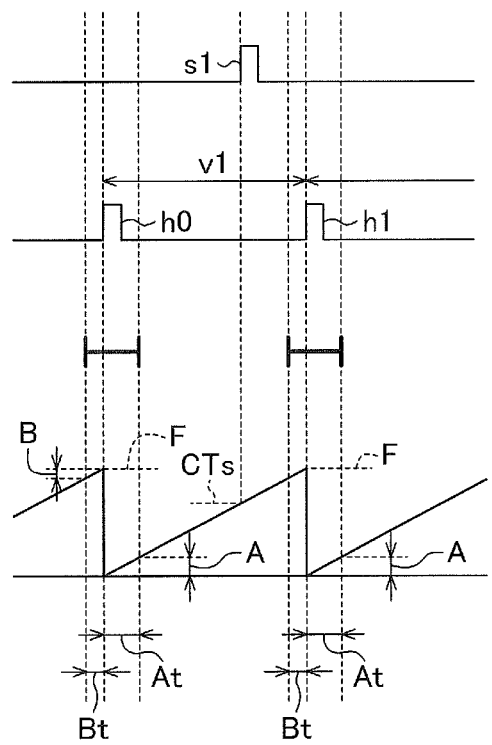

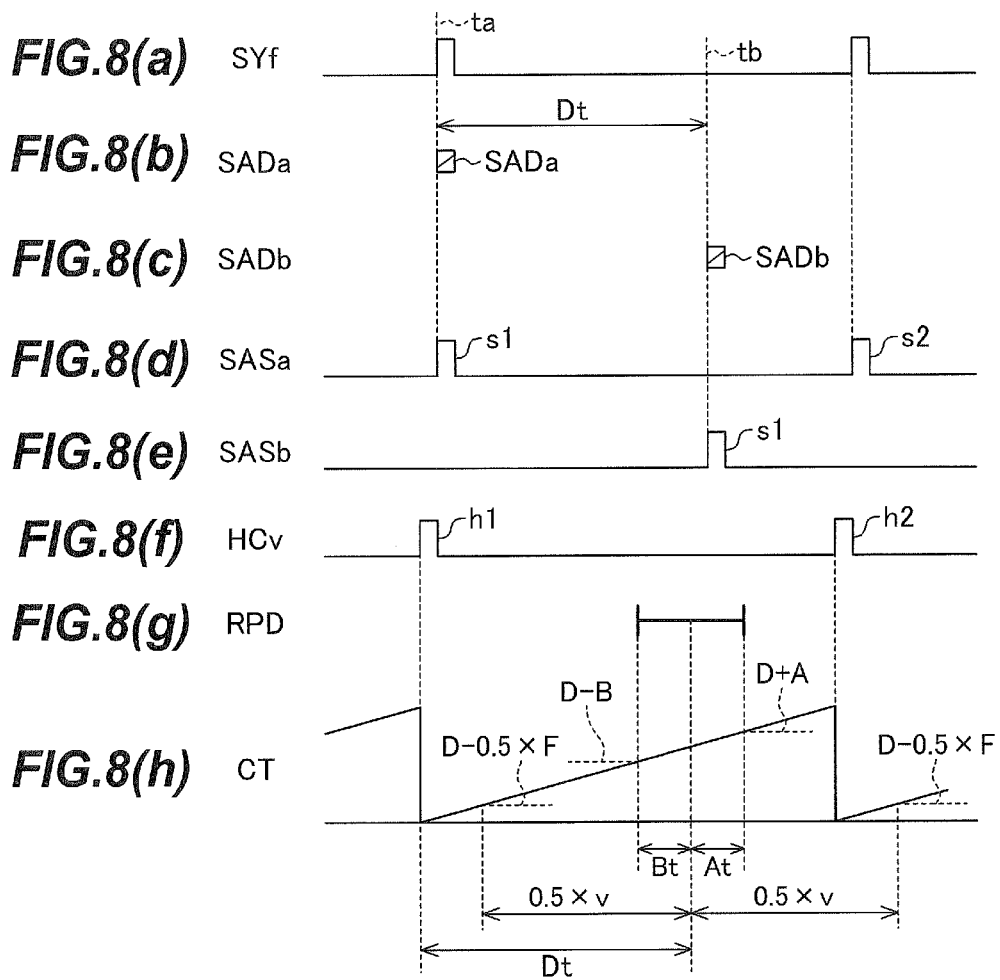

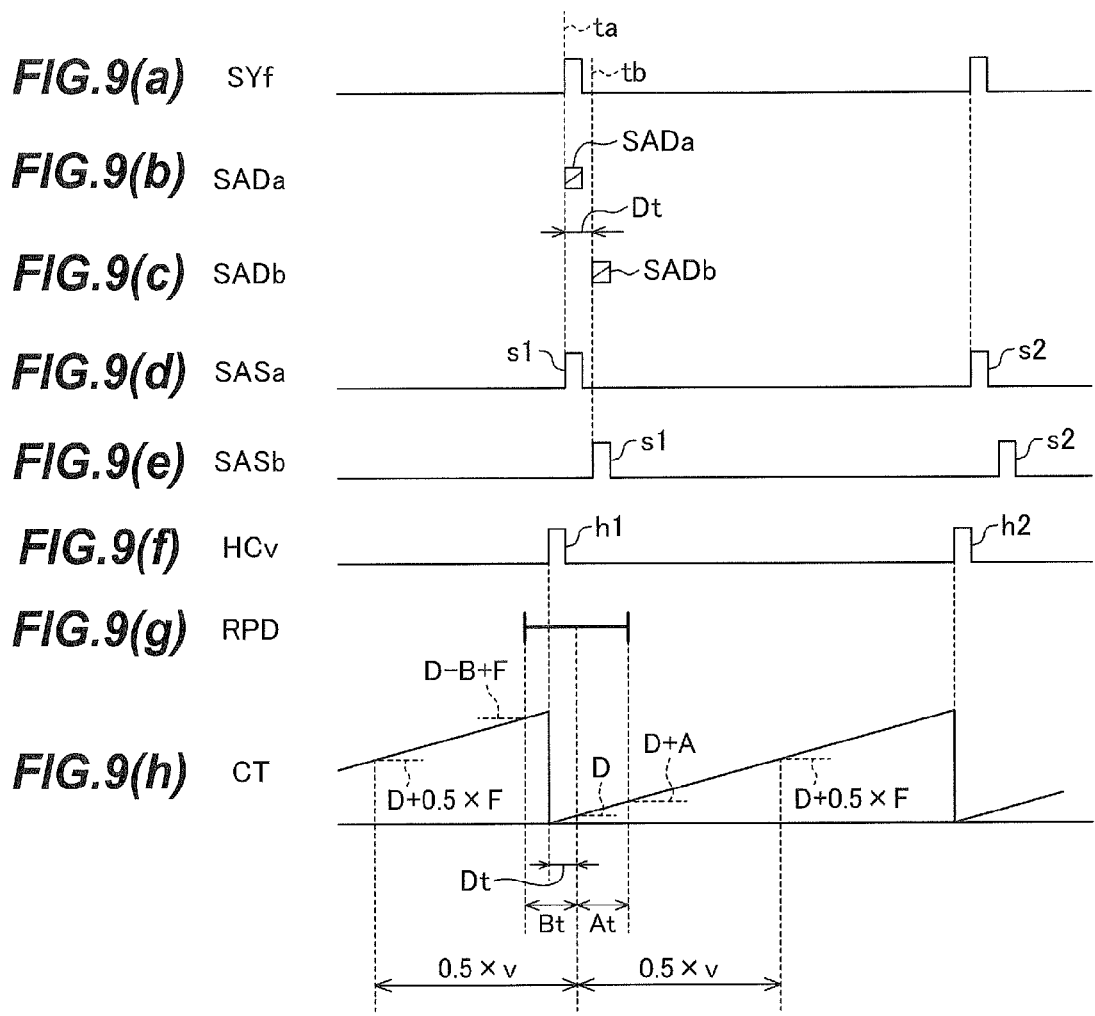

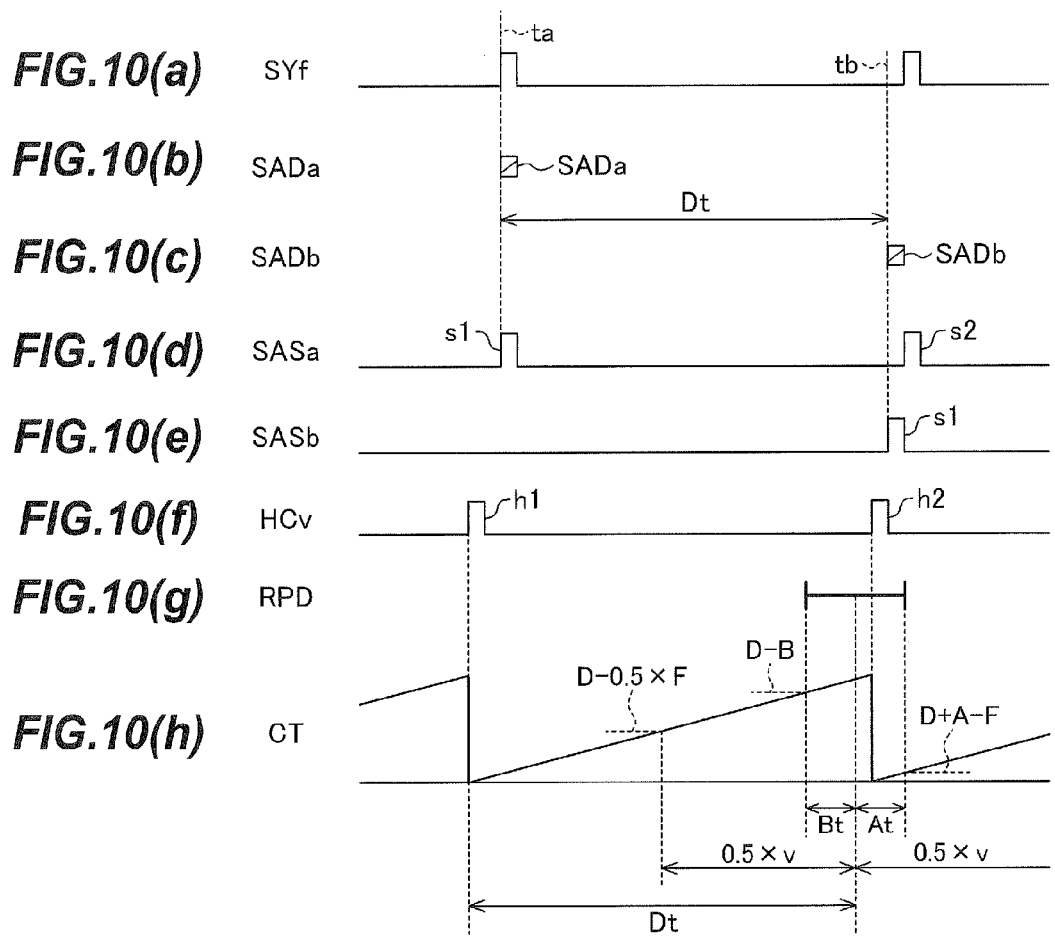

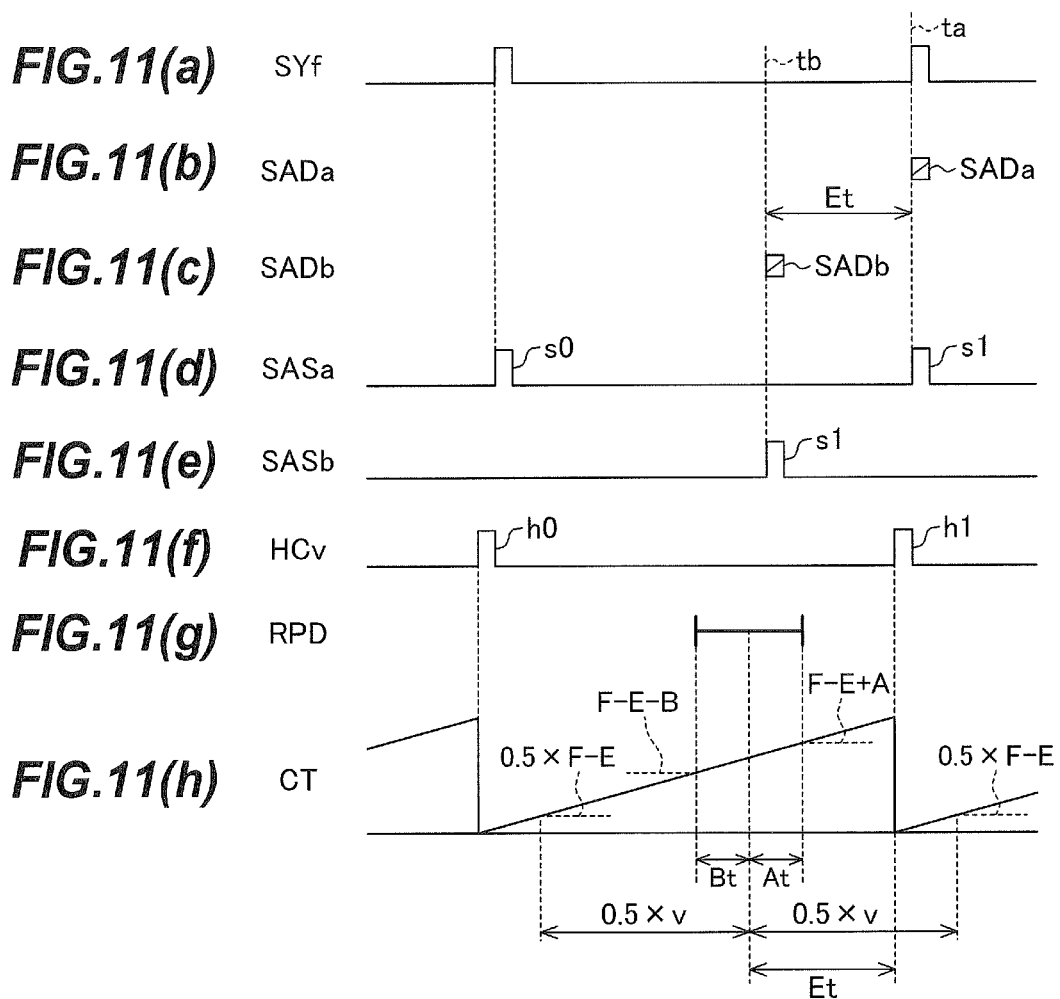

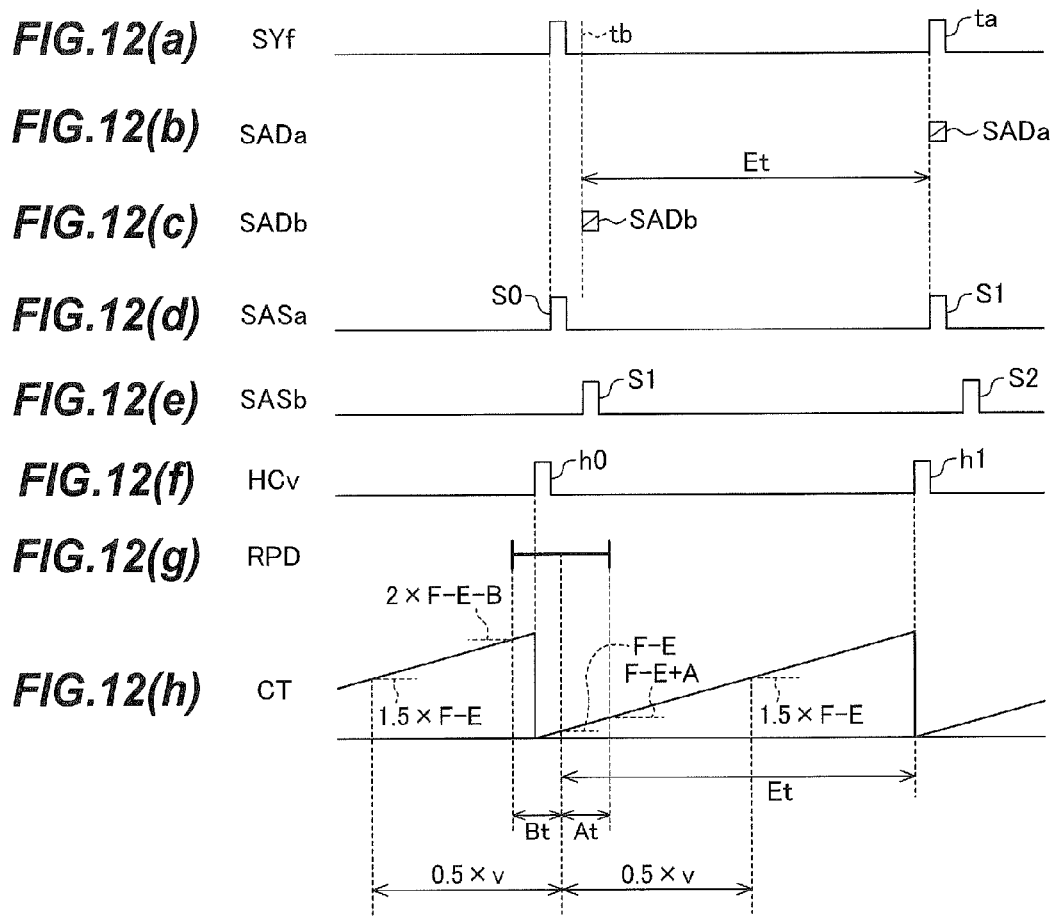

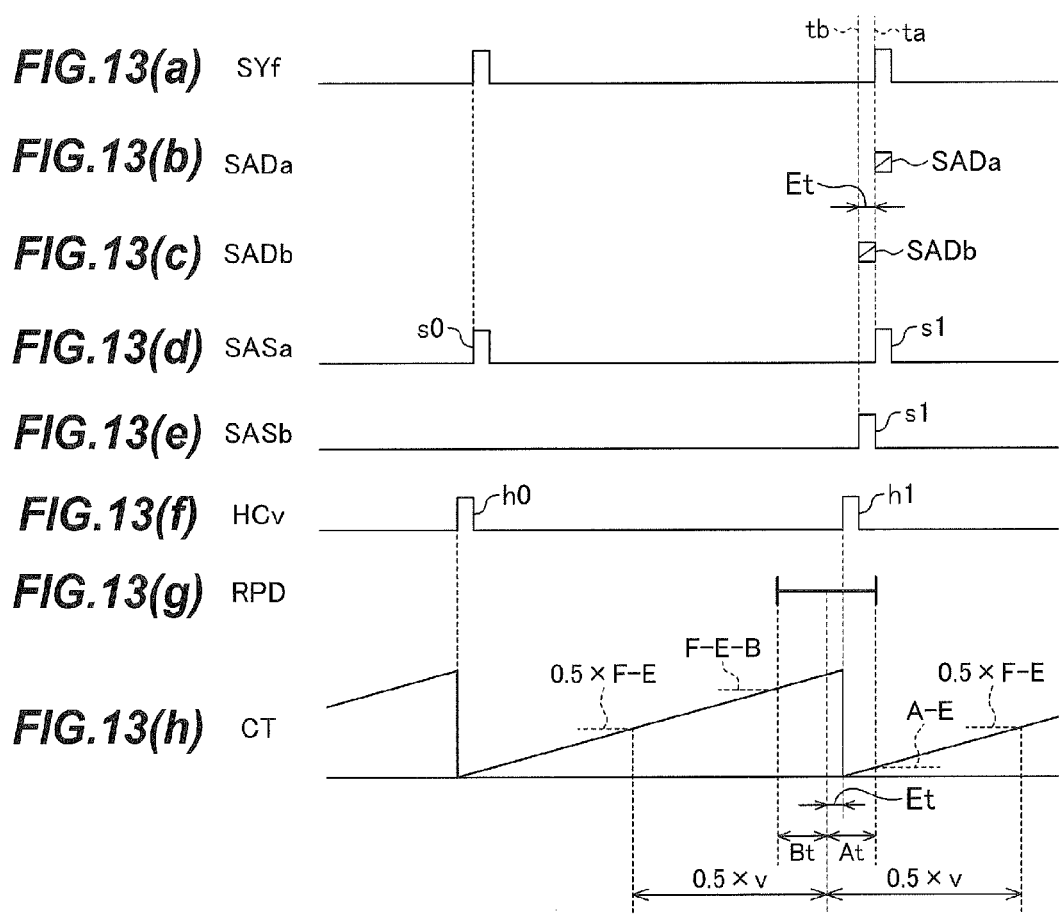

FIG.20(a) SAS
FIG.20(b) HCv (ADJUSTED)
FIG.20(c) RPD
FIG.20(d) CT
FIG.20(e) VLD
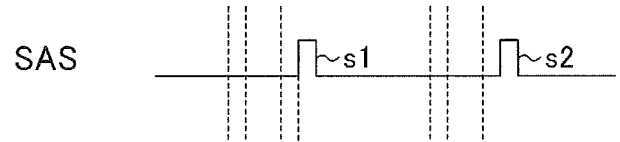
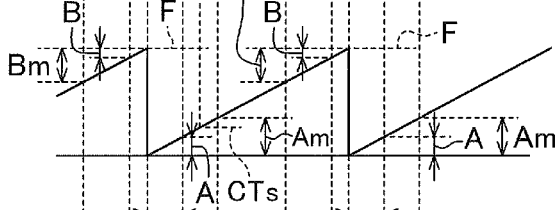
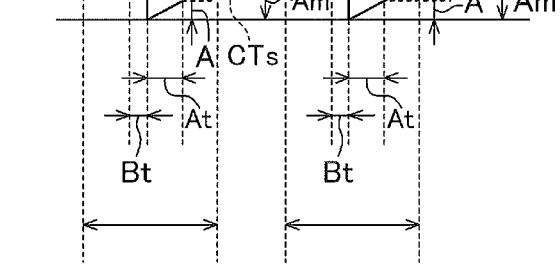

FIG.21(a) SAS 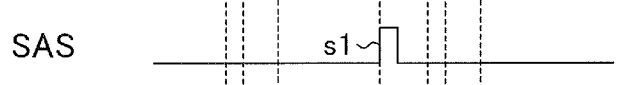
FIG.21(b) HCv (ADJUSTED) 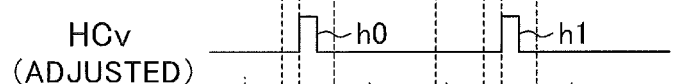
FIG.21(c) RPD 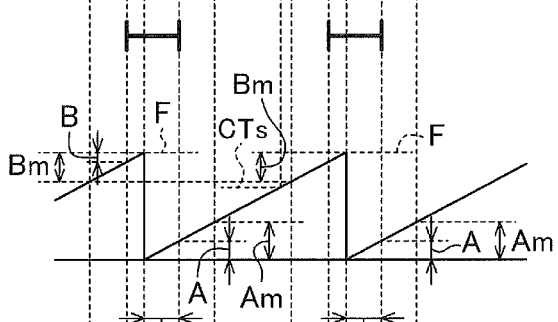
FIG.21(d) CT 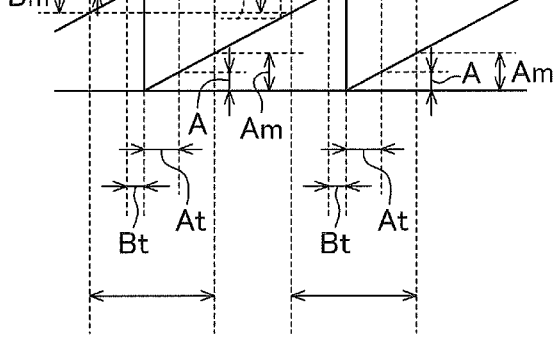
FIG.21(e) VLD 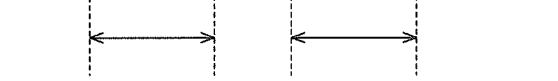

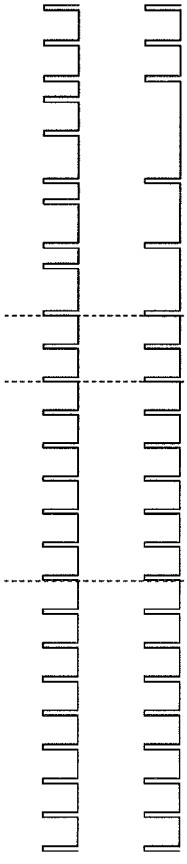
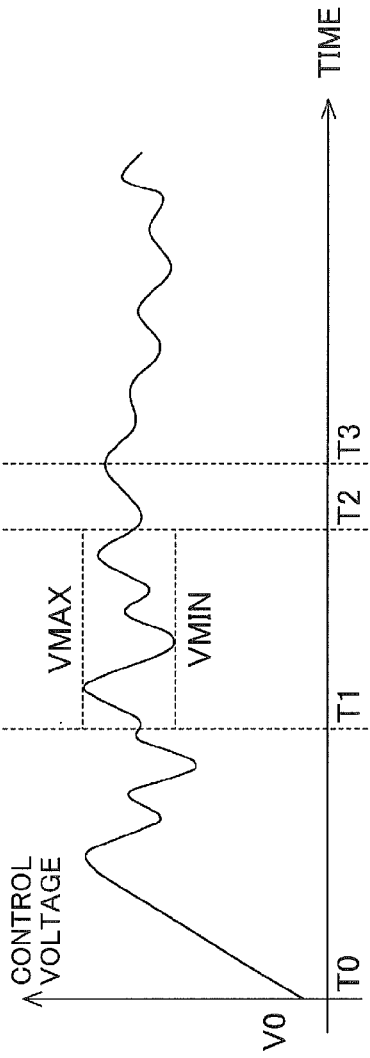
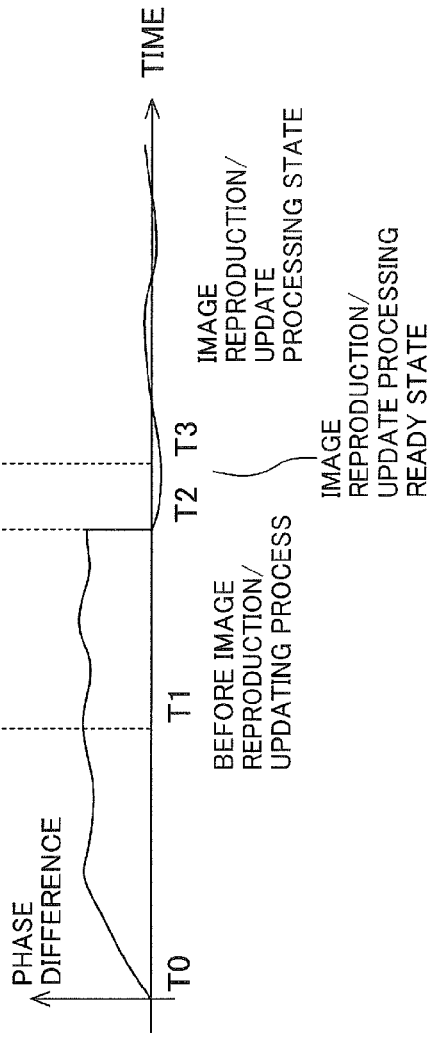
FIG.22(a) SAD
FIG.22(b) SAS
FIG.22(c) LCKCS
FIG.22(d) DIF

MULTI-SCREEN DISPLAY SYSTEM

FIELD OF THE INVENTION

The present invention relates to a multi-screen display system including a transmission device and a plurality of display devices.

BACKGROUND ART

In recent years, in railway stations, airports, shopping malls, and the like, video content, advertisements, and notices with an image size too large to fit in a single display device are increasingly being displayed on a plurality of combined or interlinked display devices such as liquid crystal displays, electronic display boards using LEDs, or plasma displays, which are installed adjacent one another.

In patent document 1, an image signal repeater for reproducing and outputting image signals received from an image signal generating apparatus, an image display device with an image signal repeater function, and a method for controlling them are proposed.

PRIOR ART REFERENCES

Patent Documents

Patent document 1: Japanese Patent No. 3704121 (pp. 7-8, pp. 14-15, FIG. 2, FIG. 5, FIG. 7, and FIG. 10)

SUMMARY OF THE INVENTION

Problem to be Solved by the Invention

The image signal repeater and the image display device with an image signal repeater function replace the clock signal based on the synchronizing signal corresponding to an input image signal with an internally generated replacement clock, regenerate the input image signal by using the replacement clock signal, and adjust the horizontal total number of dots (horizontal total number of pixels) or the vertical total number of lines, thereby canceling the phase difference between the input image signal and the reproduced image signal. Canceling the phase difference between the input image signal and reproduced image signal enables any frequency difference that develops between the internally generated clock and input clock to be automatically corrected. The device in Patent document 1 is unsatisfactory, however, in regard to synchronization of image updating among the plurality of image display devices because of a lack of consideration for network delay from the transmitting device to the display devices.

The present invention addresses the problem described above with the object of synchronizing image updating on a plurality of display devices (limiting the differences to within a fixed range).

Means for Solving the Problem

A multi-screen display system according to the present invention is a multi-screen display system in which a transmitting apparatus and a plurality of display devices are interconnected via a network, wherein:

the transmitting apparatus comprises a system master clock for generating a reference clock time of the system, a storage means for storing image data, a data generation means for generating reproduction control information from the reference clock time generated by the system master clock and adding the reproduction control information to image data read from the storage means, thereby generating image data with reproduction control information, and generating synchronization adjustment data for adjusting a reproduced image update timing from the reference clock time generated by the system master clock, and a data transmission means for transmitting the image data with reproduction control information and the synchronization adjustment data;

each of the plurality of display devices includes a data reception means for receiving the image data with reproduction control information and the synchronization adjustment data transmitted from the data transmission means in the transmitting apparatus, and generating a synchronization adjustment signal from the synchronization adjustment data, an image reproduction/updating control means for performing an image reproduction/update process based on the reproduction control information included in the image data with reproduction control information received by the data reception means, and the synchronization adjustment signal, thereby outputting a reproduced image, and generating an image display control signal for deciding an image update timing, and an image display means that displays the reproduced image output from the image reproduction/updating control means at a timing of the image display control signal; and the image reproduction/updating control means increases and decreases subsequent periods of the image display control signal according to a phase difference between the synchronization adjustment signal output from the data reception means and the image display control signal output to the image display means, controlling the periods so as to reduce the phase difference, thereby synchronizing image update timings among the plurality of display devices.

Effect of the Invention

According to the present invention, image updating can be synchronized among a plurality of display devices.

BRIEF DESCRIPTION OF THE DRAWINGS

FIGS. 4(a) to 4(g) constitute a diagram illustrating correction of the vertical synchronization signal by the control signal generation means 71 when the synchronization adjustment signal (SAS) lags the vertical synchronization signal (HCv).

FIGS. 5(a) to 5(g) constitute a diagram illustrating correction of the vertical synchronization signal by the control signal generation means 71 when the synchronization adjustment signal (SAS) leads the vertical synchronization signal (HCv).

FIGS. 6(a) to 6(d) constitute a diagram illustrating the relationship between the count value of the counter 71a in the control signal generation means 71 according to the first and second embodiments of the invention and the phase difference tolerance range when the synchronization adjustment signal (SAS) lags the vertical synchronization signal (HCv).

FIGS. 7(a) to 7(d) constitute a diagram illustrating the relationship between the count value of the counter 71a in the control signal generation means 71 according to the first and second embodiments of the invention and the phase difference tolerance range when the synchronization adjustment signal (SAS) leads the vertical synchronization signal (HCv).

FIGS. 8(a) to 8(h) constitute a diagram illustrating the relationship between the phase difference and its tolerance range when transmission time difference information (TDD) indicating a transmission delay time is used.

FIGS. 9(a) to 9(h) constitute a diagram illustrating the relationship between the phase difference and its tolerance range when transmission time difference information (TDD) indicating a transmission delay time is used.

FIGS. 10(a) to 10(h) constitute a diagram illustrating the relationship between the phase difference and its tolerance range when transmission time difference information (TDD) indicating a transmission delay time is used.

FIGS. 11(a) to 11(h) constitute a diagram illustrating the relationship between the phase difference and its tolerance range when transmission time difference information (TDD) indicating a transmission lead time is used.

FIGS. 12(a) to 12(h) constitute a diagram illustrating the relationship between the phase difference and its tolerance range when transmission time difference information (TDD) indicating a transmission lead time is used.

FIGS. 13(a) to 13(h) constitute a diagram illustrating the relationship between the phase difference and its tolerance range when transmission time difference information (TDD) indicating a transmission lead time is used.

FIGS. 20(a) to 20(e) constitute a diagram illustrating the relationship between the count value of the cyclic counter 93 in the control signal generation means 90 according to the third embodiment and the phase difference tolerance range when the synchronization adjustment signal (SAS) lags the vertical synchronization signal (HCv).

FIGS. 21(a) to 21(e) constitute a diagram illustrating the relationship between the count value of the cyclic counter 93 in the control signal generation means 90 according to the third embodiment and the phase difference tolerance range when the synchronization adjustment signal (SAS) leads the vertical synchronization signal (HCv).

FIGS. 22(a) to 22(d) constitute a diagram illustrating the relationship among the control voltage, the phase difference, and the time from the startup of the n-th display device HS-n to the image reproduction/update process, when the local clock generation means 10 is a voltage controlled oscillator (VCXO).

MODE FOR CARRYING OUT THE INVENTION

First Embodiment

Figure 1:
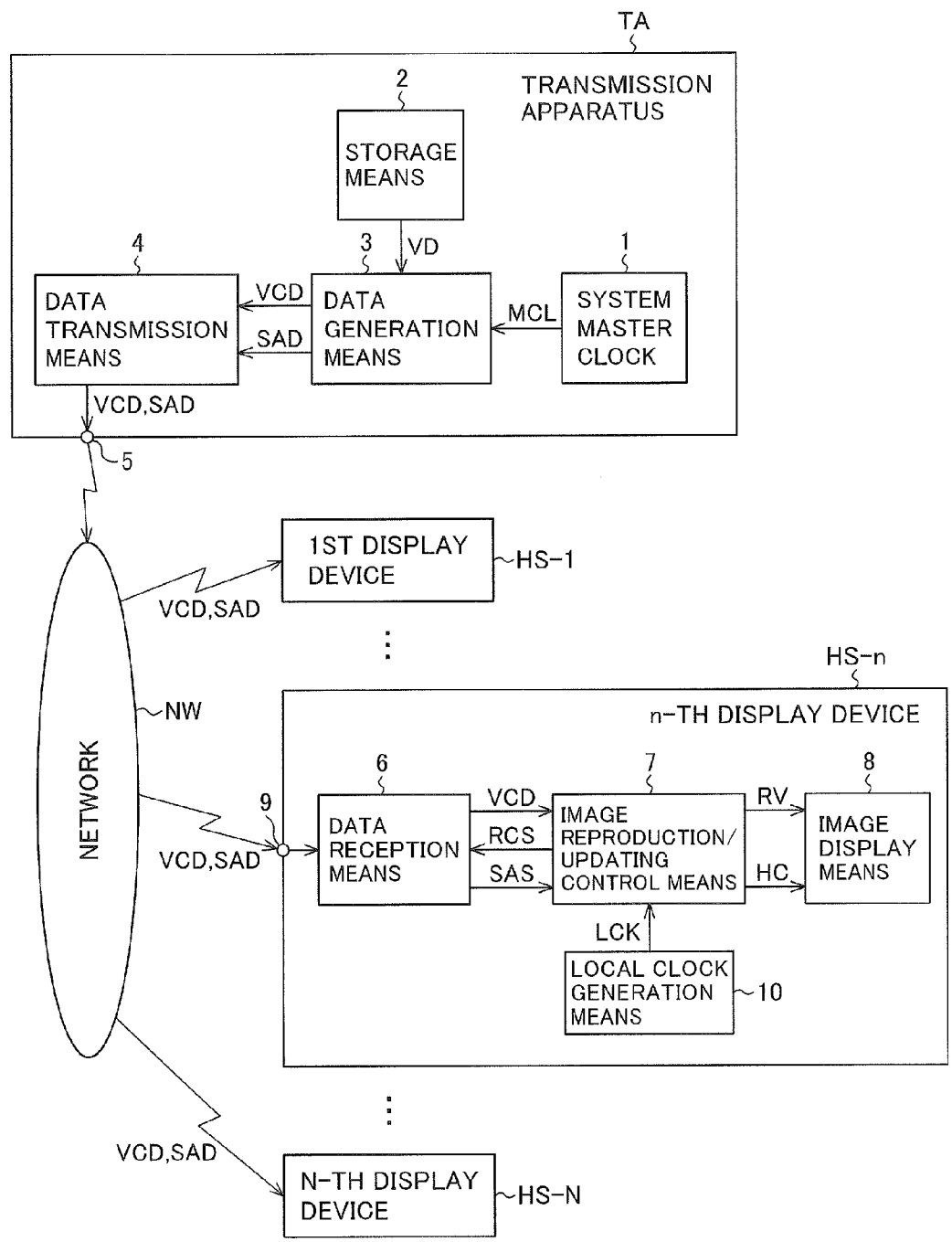
FIG. 1 is a block diagram showing the main components of a multi-screen display system according to a first embodiment and a third embodiment of the invention.

FIG. 1 is a block diagram showing the main components of a multi-screen display system according to the first embodiment of the present invention.

The multi-screen display system includes a transmitting apparatus TA and first to N-th display devices HS-1 to HS-N (N being an integer equal to or greater than 2), which are connected by a network NW.

The transmitting apparatus TA includes a system master clock 1, a storage means 2, a data generation means 3, a data transmission means 4, and an output terminal 5. Each of the first to N-th display devices HS-1 to HS-N includes a data reception means 6, an image reproduction/updating control means 7, an image display means 8, an input terminal 9, and a local clock generation means 10.

The first to N-th display devices HS-1 to HS-N have mutually identical internal structures. The internal structure of an arbitrary one of these devices, referred to as the n-th display device HS-n (n being any of 1 to N), is shown in the drawing and will be described.

The system master clock 1 is the reference clock of the multi-screen display system and generates (data indicating) the system master clock time MCL.

The storage means 2 is a memory in which image data VD are stored. The data to be stored are not limited to image data but may be video data including audio data.

The data generation means 3 generates reproduction control information RCD, such as timestamps, based on the system master clock time MCL acquired from the system master clock 1 and adds the generated information to the image data VD stored in the storage means 2, thereby generating image data (with reproduction control information) VCD. When the image data VD stored in the storage means 2 are unencoded image data, the data generation means 3 may include an encoding means and carry out an encoding process. Synchronization adjustment data SAD for adjusting the update timing of the reproduced image (RV) in each of the display devices HS-1 to HS-N, as described later, are also generated from the system master clock 1.

The data transmission means 4 outputs the image data (with reproduction control information) VCD and the synchronization adjustment data SAD to the output terminal 5, while adjusting their transmission timing.

The image data VD received by the display devices HS-1 to HS-N may sometimes be mutually identical and may sometimes differ from each other. This is also true of the reproduction control information RCD and the image data (with reproduction control information) VCD.

The image data (with reproduction control information) VCD and synchronization adjustment data SAD are output from the output terminal 5 to the network NW.

The data reception means 6 in each of the first to N-th display devices HS-1 to HS-N temporarily stores the image data (with reproduction control information) VCD input from the input terminal 9 in an internal receive buffer 62 (described later) and outputs them to the image reproduction/updating control means 7 according to a read control signal RCS from the image reproduction/updating control means 7. The data reception means 6 also generates a synchronization adjustment signal SAS from the synchronization adjustment data SAD, which are input from the input terminal 9, and outputs it to the image reproduction/updating control means 7.

Running autonomously from the start of operation, the image reproduction/updating control means 7 generates the read control signals RCS for the data reception means 6 at prescribed timings, as a result of which the image data (with reproduction control information) VCD are input. The image reproduction/updating control means 7 outputs image display control signals HC and the reproduced image RV to the image display means 8. The image reproduction/updating control means 7 uses the synchronization adjustment signal SAS output from the data reception means 6 and the image display control signals HC to vary the output timing of the image display control signals HC in the next cycle or the image display control signals HC in subsequent cycles.

The image display means 8 receives the reproduced image RV and image display control signals HC output from the image reproduction/updating control means 7 and displays the reproduced image RV on a display device such as an electronic display board using LEDs, a liquid crystal display, or a plasma display.

Figure 2:
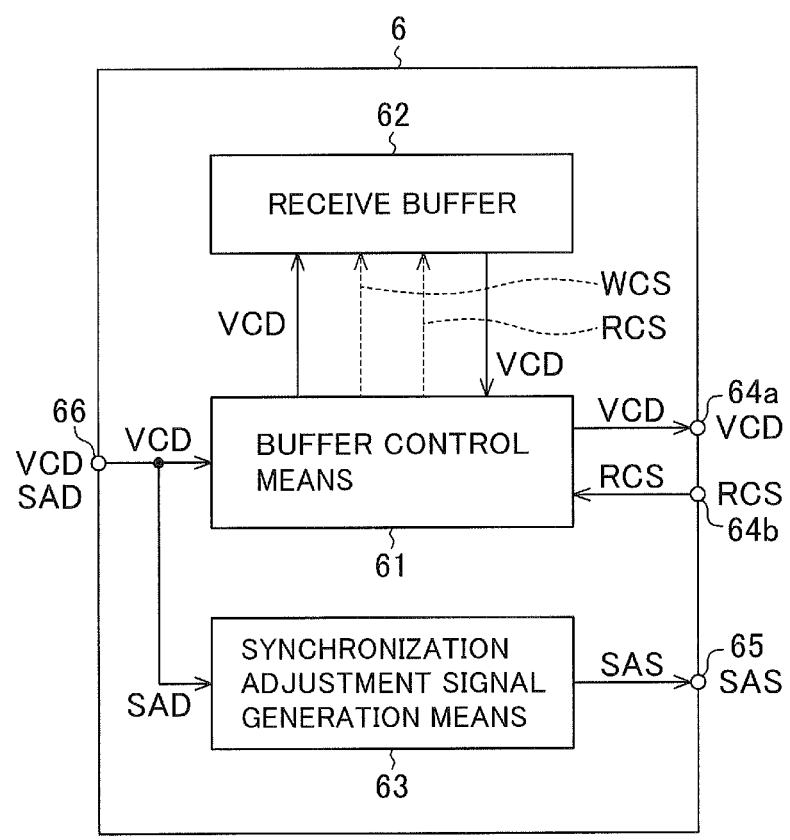
FIG. 2 is a block diagram showing the main components of the data reception means 6 in FIG. 1.

FIG. 2 is a block diagram showing the main components of the data reception means 6.

The data reception means 6 includes a buffer control means 61, a receive buffer 62, a synchronization adjustment signal generation means 63, input terminals 66 and 64*b*, and output terminals 64*a* and 65.

The image data (with reproduction control information) VCD are input from input terminal 66.

The buffer control means 61 writes the image data (with reproduction control information) VCD input from input terminal 66 into the receive buffer 62. The buffer control means 61 also reads the image data (with reproduction control information) VCD from the receive buffer 62, according to the read control signal RCS input from input terminal 64*b*.

The receive buffer 62 stores the image data (with reproduction control information) VCD responsive to a write control signal WCS from the buffer control means 61; the image data (with reproduction control information) VCD are read out in response to a read control signal RCS from the buffer control means 61.

The synchronization adjustment signal generation means 63 generates the synchronization adjustment signal SAS from the synchronization adjustment data SAD input from the input terminal 66. More specifically, once it receives the synchronization adjustment data SAD, it immediately generates the synchronization adjustment signal SAS. Instead of generating the synchronization adjustment signal SAS immediately after receiving the synchronization adjustment data SAD, it may generate the synchronization adjustment signal SAS with a prescribed phase difference (time difference) from the timing of reception of the synchronization adjustment data SAD.

The read control signal RCS from the image reproduction/updating control means 7 is input at input terminal 64*b*, and the image data (with reproduction control information) VCD read from the receive buffer 62 are output from output terminal 64*a*. The synchronization adjustment signal SAS generated in the synchronization adjustment signal generation means 63 is output from output terminal 65.

Figure 3:
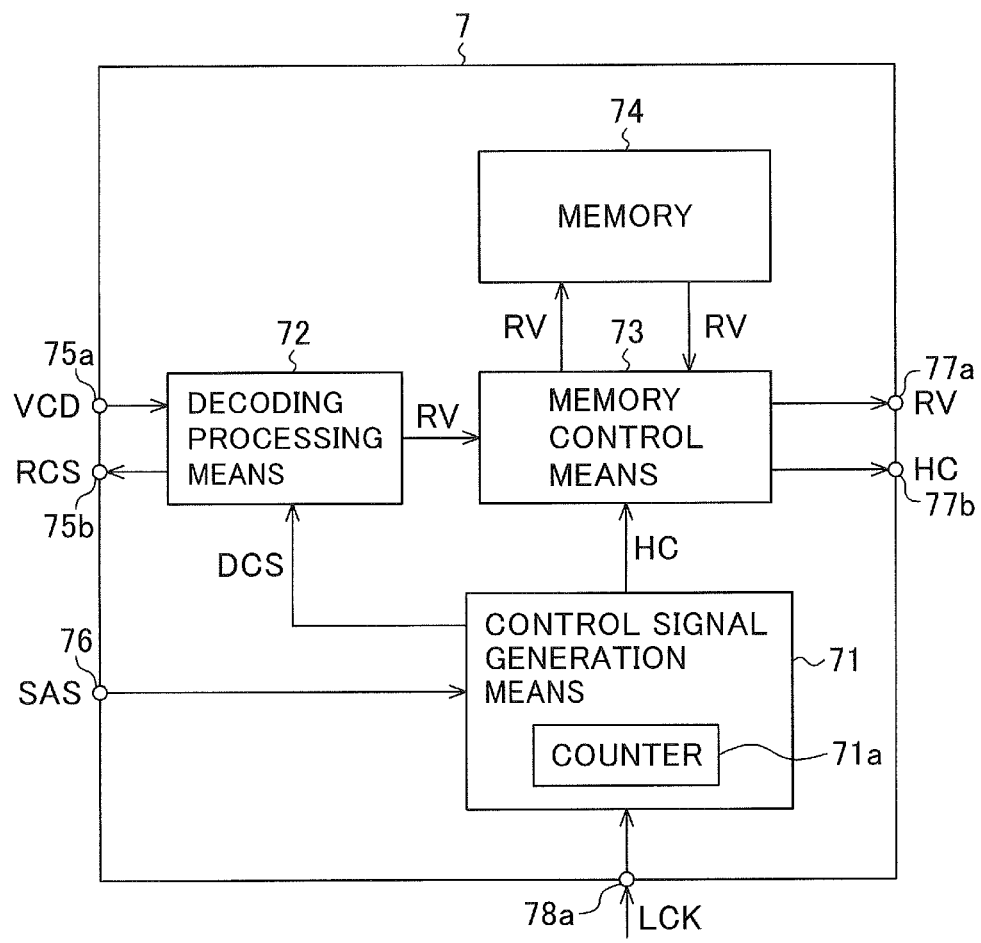
FIG. 3 is a block diagram showing the main components of the image reproduction/updating control means 7 in FIG. 1.

FIG. 3 is a block diagram showing the main components of the image reproduction/updating control means 7. The image reproduction/updating control means 7 includes a control signal generation means 71, a decoding processing means 72, a memory control means 73, a memory 74, input terminals 75*a*, 76, 78*a*, and output terminals 75*b*, 77*a*, 77*b*.

The synchronization adjustment signal SAS is input at input terminal 76.

The control signal generation means 71 receives a reference clock LCK supplied via input terminal 78*a* from the local clock generation means 10, outputs a decoding process control signal DCS for the decoding process to the decoding processing means 72, and generates image display control signals HC for display output and outputs them to the memory control means 73. At this time, the control signal generation means 71 adjusts the timing of the subsequent image display control signals (in the next cycle or subsequent cycles) according to the phase difference between the synchronization adjustment signal SAS input at input terminal 76 and the current image display control signals HC (in the current frame).

The decoding processing means 72 outputs the read control signal RCS from output terminal 75*b* responsive to the decoding process control signal DCS from the control signal generation means 71, receives the image data (with reproduction control information) VCD from input terminal 75*a*, performs a decoding process on the image data VD included in the image data (with reproduction control information) VCD, controlling the timing of the process according to the reproduction control information RCD included in the image data (with reproduction control information) VCD, and thereby generates the reproduced image RV.

The memory control means 73 temporarily writes the reproduced image RV output by the decoding process in the decoding processing means 72 into the memory 74, reads the reproduced image RV from the memory 74 responsive to the image display control signals HC from the control signal generation means 71, and outputs the reproduced image RV. The memory control means 73 also outputs the image display control signals HC to output terminal 77*b*.

The reproduced image RV is output from output terminal 77*a*; the image display control signals HC are output from output terminal 77*b*.

The operation of the multi-screen display system having the above structure will be described with reference to FIGS. 1 to 3.

The system master clock 1, which is the master clock of the multi-screen display system, generates data indicating the master clock time. The first to N-th display devices HS-1 to HS-N individually correct the reference clock times LCK generated by their local clock generation means 10 to make them match the system master clock 1. This will be described in detail later.

The image data stored in the storage means 2 are video content, advertisements, and notices to be displayed on the display devices HS, and are encoded according to, for example, ITU-T (International Telecommunication Union-Telecommunication sector) recommendation H.26x or ISO/IEC (International Organization for Standardization/International Electrotechnical Commission) standard MPEG (Moving Picture Experts Group). The images are not limited to moving images; they may be still images such as JPEG (Joint Photographic Experts Group) images. The image data may of course be accompanied by audio data. The data stored in the storage means 2 are not limited to encoded data; unencoded (image or video) data may be stored in the storage means 2 and then encoded in the data generation means 3.

The data generation means 3 generates the reproduction control information RCD, such as timestamps, based on (data indicating) the system reference clock time acquired from the system master clock 1 and adds this information to the image data stored in the storage means 2, thereby generating the image data (with reproduction control information) VCD.

The reproduction control information RCD consists of timestamps defining reproduction times, such as a PTS (Presentation Time Stamp), DTS (Decoding Time Stamp), or the like. The image data (with reproduction control information) VCD are accordingly, for example, an MPEG-2 TS (Transport Stream).

In the data generation means 3, the synchronization adjustment data SAD for adjusting the update timing of reproduced images RV in the display devices HS-1 to HS-N are generated based on (data indicating) the system reference clock time acquired from the system master clock 1.

The synchronization adjustment data SAD are basically reference signals (data) used to adjust the update timing of the reproduced image RV in each of the first to N-th display devices HS-1 to HS-N and are transmitted periodically; they may be generated, for example, in each frame, but this is not necessary; they need only be transmitted at intervals enabling correction of deviation in the reproduced image RV update timing due to error in the clocks LCK generated by the local clock generation means 10 in each of the first to N-th display devices HS-1 to HS-N.

The synchronization adjustment data SAD need not necessarily be transmitted periodically; they may be transmitted at any timing negotiated between the transmitting apparatus TA and the first to N-th display devices HS-1 to HS-N.

The transmission cycle of the synchronization adjustment data SAD is preferably M times the cycle of the image update timing of the reproduced image RV in each of the display devices HS-1 to HS-N (M is an integer equal to or greater than 1). M need not be a fixed value (that is, it may vary with time), and may differ for each of the display devices HS-1 to HS-N. For simplicity, the following description will assume that M is fixed at unity.

The data transmission means 4 transmits the image data (with reproduction control information) VCD and the synchronization adjustment data SAD generated in the data generation means 3, from output terminal 5, continuously adjusting their transmission timing. For example, if the transmission timing of the synchronization adjustment data SAD arrives during the transmission of image data (with reproduction control information) VCD, the synchronization adjustment data SAD are transmitted after the series of image data (with reproduction control information) VCD has been transmitted. At this time, information indicating the lag from the regular periodic timing (the timing at which the synchronization adjustment data SAD were generated in the data generation means 3, or a timing allowing for the delay from the time when the synchronization adjustment data SAD are generated in the data generation means 3 to the time when the data are actually transmitted from the data transmission means 4, or the like) may be added as transmission time difference information TDD and transmitted together with the synchronization adjustment data SAD.

The image data (with reproduction control information) VCD and synchronization adjustment data SAD (and transmission time difference information TDD) output from the data transmission means 4 in the transmission apparatus TA via output terminal 5 are transmitted over the network NW to the first to N-th display devices HS-1 to HS-N.

The transmitting apparatus TA and the first to N-th display devices HS-1 to HS-N are networked by the network NW, and due to traffic conditions, the transmission delay is usually not constant. However, this embodiment assumes that the transmitting apparatus TA and the first to N-th display devices HS-1 to HS-N constitute a closed network, and that the amount of data (traffic) transmitted using the network and fluctuations in the amount are controlled to stay within a certain range, so that, accordingly, barring the sudden occurrence of an unanticipated amount of traffic, an adequate bandwidth is secured; that is, although there may be a certain amount of variation in the transmission delays from the transmitting apparatus TA to the first to N-th display devices HS-1 to HS-N, the frame rate and/or the amount of data are set at levels at which the display processing in the display devices does not crash. As long as the above conditions are satisfied, the network is not limited to a wired network but may be a wireless network. Wired networks are not limited to Ethernet (registered trademark) but may use PLC (Power Line Communication), or the like.

The image data (with reproduction control information) VCD are input to the data reception means 6 via input terminal 9. The image data (with reproduction control information) VCD input through input terminal 9 to the data reception means 6 are input via input terminal 66, shown in FIG. 2, to the buffer control means 61. The image data (with reproduction control information) VCD input to the buffer control means 61 are input to the receive buffer 62 and temporarily stored therein.

Similarly, the synchronization adjustment data SAD are input to the data reception means 6 via input terminal 9. The synchronization adjustment data SAD input to the data reception means 6 via input terminal 9 are input to the synchronization adjustment signal generation means 63 via input terminal 66. When the synchronization adjustment signal generation means 63 receives the synchronization adjustment data SAD, it immediately generates a synchronization adjustment signal SAS based thereon and outputs this signal via output terminal 65 to the image reproduction/updating control means 7. As described above, the synchronization adjustment signal SAS may be generated with a prescribed phase difference from the reception of the synchronization adjustment data SAD.

If the synchronization adjustment signal generation means 63 generates the synchronization adjustment signal SAS immediately after receiving the synchronization adjustment data SAD, in order to restrict delay fluctuation in the generation of the synchronization adjustment signal SAS due to internal processing load conditions (e.g., storing the image data (with reproduction control information) VCD input from input terminal 9 in the buffer control means 61, and the decoding process in the decoding processing means 72) among the first to N-th display devices HS-1 to HS-N, the synchronization adjustment signal generation means 63 gives highest priority to this process so as to minimize time from the input of the synchronization adjustment data SAD at input terminal 9 to the output of the synchronization adjustment signal SAS.

The control signal generation means 71 in the image reproduction/updating control means 7 outputs the decoding process control signal DCS that it generates based on the clock LCK generated by the local clock generation means 10, to the decoding processing means 72. The decoding processing means 72 then, if it is in a state in which it is capable of performing decoding processing (i.e., in the standby or inactive state), outputs a read control signal RCS via output terminal 75b to the data reception means 6.

The read control signal RCS output from the decoding processing means 72 is input to the buffer control means 61 via output terminal 75b and input terminal 64b of the data reception means 6. The buffer control means 61 receives the read control signal RCS input through input terminal 64b, reads the image data (with reproduction control information) VCD from the receive buffer 62, and outputs the data from output terminal 64a to the image reproduction/updating control means 7.

The image data (with reproduction control information) VCD output from the data reception means 6 are input to the decoding processing means 72 via input terminal 75a. From the reproduction control information RCD in the image data (with reproduction control information) VCD input from input terminal 75a, the decoding processing means 72 calculates a decoding processing completion time (from a PTS) or decoding processing start time (from a DTS) and outputs a decoded image (also referred to as 'reproduced image' and denoted RV) obtained by performance of the decoding processing at that time to the memory control means 73. The memory control means 73 temporarily stores the reproduced image RV output from the decoding processing means 72 in the memory 74.

The synchronization adjustment signal SAS output via output terminal 65 from the data reception means 6 is input via input terminal 76 of the image reproduction/updating control means 7 to the control signal generation means 71.

The control signal generation means 71 outputs the decoding process control signal DCS to the decoding processing means 72, and on the basis of the clock (local clock) LCK generated by the local clock generation means 10, generates image display control signals HC and outputs them to the memory control means 73. The image display control signals HC include a vertical synchronization signal HCv, a horizontal synchronization signal HCh, and a dot clock DCK.

The control signal generation means 71 determines the timing of the following image display control signals HC (generated in the next frame or subsequent frames) from the phase difference between the synchronization adjustment signal SAS input from the data reception means 6 and the image display control signals HC. Details will be given later.

The dot clock is used as the output synchronization signal for each pixel signal. The number of dot clocks (the number of clock pulses, or the number of clock cycles) generated in each line matches the total number of pixels (including non-effective pixels) in each line. The number of dot clocks generated in each frame matches the total number of pixels (including pixels in non-effective lines and non-effective pixels in each line).

The counter 71a may count pixels instead of lines. At this time, F is equivalent to the total number of pixels.

The memory control means 73 reads the reproduced image RV from the memory 74 on the basis of the image display control signals HC input from the control signal generation means 71, and outputs the reproduced image at input terminal 77a. The memory control means 73 outputs the image display control signals at output terminal 77b in synchronization with the output timing of the reproduced image RV at this time.

The image display means 8 displays the image on the screen of a display constituting part of the image display means 8 in response to input of the reproduced image RV and image display control signals HC from the image reproduction/updating control means 7. In the image display control signals HC, in particular, the vertical synchronization signal HCv controls the image update timing.

Next, clock time synchronization between the transmitting apparatus TA and the first to N-th display devices HS-1 to HS-N will be described. The clock synchronization protocol known as NTP (Network Time Protocol), which is widely used on the Internet, is employed, for example. NTP provides a hierarchical structure such that the top NTP server obtains the exact time from a clock of very high precision and accuracy, such as an atomic clock, or the GPS (Global Positioning System); lower-order NTP servers (level-A servers) reference that time and synchronize their time therewith, and still lower-order NTP servers (level-B servers, level B being below level A) and clients reference the level-A NTP servers and synchronize their time therewith, so that a plurality of clients can efficiently synchronize their time. In referencing time, the transmission delay on the network is measured and corrected to minimize the impact of variations and fluctuations in transmission delay; time can be synchronized with a precision of within a few milliseconds.

In this embodiment, the first to N-th display devices HS-1 to HS-N need not necessarily be synchronized with the top NTP server, but need only be synchronized with the transmitting apparatus TA. Accordingly, an NTP server (system reference clock 1) is installed in the transmitting apparatus TA. The transmitting apparatus TA may obtain the reference time from a higher-level NTP server (not shown) via an external network (not shown), or a GPS receiver may be installed in the system reference clock 1 of the transmitting apparatus TA to obtain the time used as the reference time within the system.

Timestamps referenced to the time synchronized with a precision of within a few milliseconds among the transmitting apparatus TA and the first to N-th display devices HS-1 to HS-N are added, in the data generation means 3, to the reproduction control information RCD in the image data (with reproduction control information) VCD transmitted from the transmitting apparatus TA to define the reproduction time. The decoding processing means 72 in each of the first to N-th display devices HS-1 to HS-N executes a decoding process in synchronization with this reproduction time. Accordingly, timing discrepancies roughly equal to the time synchronization error among the first to N-th display devices HS-1 to HS-N occur between the decoding processes in the first to N-th display devices HS-1 to HS-N.

Next, clock drift will be described. Each of the first to N-th display devices HS-1 to HS-N includes a local clock generation means 10, and the clocks LCK generated by the individual local clock generation means 10 drift. Clock drift is often expressed in units of ppm (parts per million). A drift of ±50 ppm may generate deviations of ±4.5 seconds per day and cause differences of up to 9 seconds per day among the multiple display devices. For a 30-fps (frames per second) video signal, this is equivalent to a difference of 273 frames.

A value obtained by counting the transmitter's reference clock is added as a PCR (Program Clock Reference) to the image data transmitted in an MPEG-2 TS packet. The receiver generates an STC (System Time Clock), which is a value obtained by counting the receiver's reference clock, and fine tunes the frequency of the receiver's reference clock so that the STC matches the PCR transmitted from the transmitter. Insertion of PCRs at 100-millisecond intervals is recommended. This embodiment follows this practice; the transmitting apparatus TA adds PCRs to the image data it transmits, and each display device HS-n receives the PCRs transmitted from the transmitting apparatus TA and fine tunes the frequency of its reference clock LCK so that the STCs generated by the local clock generation means 10 in display device HS-n match the PCRs received from the transmitting apparatus TA, thereby synchronizing the reference clock LCK of display device HS-n with the reference clock of the transmitting apparatus TA. The transmitting apparatus TA generates and transits a PCR once every 100 milliseconds by counting its reference clock, which has a frequency of 27 MHz, for example. The local clock generation means 10 in display device HS-n fine tunes the frequency of its 27-MHz reference clock LCK so that the STCs generated from this reference clock once every 100 milliseconds match the PCRs received from the transmitting apparatus TA, thereby synchronizing the reference clock CLK of display device HS-n to the reference clock of the transmitting apparatus TA.

A voltage controlled oscillator such as a VCXO (Voltage Controlled Xtal Oscillator), for example, may be used in the local clock generation means 10; the difference between the PCR value transmitted from the transmitting apparatus TA (a count value generated by counting the reference clock of the transmitting apparatus TA) and the STC count value generated by counting the reference clock LCK generated by the voltage controlled oscillator is calculated and the voltage applied to the voltage controlled oscillator is increased or reduced according to the difference, thereby varying the capacitance of an internal variable capacitance element; as a result, control is carried out to make the oscillation frequency of the reference clock LCK generated by the local clock generation means 10 match the frequency of the reference clock of the transmitting apparatus TA.

During the time while PCRs can be sent and received by an MPEG-2 TS transmission, the oscillation frequencies of the reference clocks in the transmitting apparatus TA and the first to N-th display devices HS-1 to HS-N are controlled as described above so that they become mutually identical.

Network transmission delay jitter causes jitter in the reference clock of display device HS-n. But, in a closed network such as the above, the jitter can be limited to a fixed range, and by tracking the reference clock of the transmitting apparatus TA while varying the oscillation frequency gradually, it is possible to control the clock so as to avoid buffer faults.

Next, a process for controlling the phase of the image display control signals HC output from the image reproduction/updating control means 7 to the image display means 8 according to the synchronization adjustment signal SAS output from the synchronization adjustment signal generation means 63 in the data reception means 6 in each of the first to Nth display devices HS-1 to HS-N, based on the synchronization adjustment data SAD output from the transmitting apparatus TA, will be described with reference to FIGS. 4(a) to 4(g), 5(a) to 5(g), 6(a) to 6(d), and 7(a) to 7(d). The following description will mainly describe the operation of the transmitting apparatus TA and an n-th display device HS-n, which is an arbitrary one of the first to N-th display devices.

The synchronization adjustment data SAD shown in FIGS. 4(b) and 5(b) are generated in the data generation means 3 at periodic timings based on the reference clock time MCL generated by the system master clock 1 in the transmitting apparatus TA, and output.

The synchronization adjustment data SAD are transmitted from the transmitting apparatus TA to the display devices HS-1 to HS-N, in which a synchronization adjustment signal SAS (FIGS. 4(c) and 5(c)) is generated based on the received synchronization adjustment data SAD; the synchronization adjustment signal SAS is compared with the vertical synchronization signals HCv (FIGS. 4(d) and 5(d)); if the phase difference between them is outside the tolerance range RPD (FIGS. 4(f) and 5(f)), the phase of the vertical synchronization signal HCv (FIGS. 4(d) and 5(d)) is adjusted.

Whether or not the phase difference between the synchronization adjustment signal SAS and vertical synchronization signal HCv is within the tolerance range is determined from the count value CT (FIGS. 4(g) and 5(g)) given by the counter 71a in the control signal generation means 71 in each display device as described later. More specifically, whether or not the phase difference between the synchronization adjustment signal SAS and vertical synchronization signal HCv is within the tolerance range RPD is determined from the value of the count CTs given by the counter 71a when the synchronization adjustment signal SAS is received; if the phase difference is outside the tolerance range, then whether the vertical synchronization signal HCv leads or lags the synchronization adjustment signal SAS is determined; the output phase of the following vertical synchronization signal HCv (in the next frame or a subsequent frame) is then adjusted according to the result of this determination. The phase is adjusted by adjustment of the number of cycles (number of clocks) from the occurrence of the previous vertical synchronization signal HCv to the next occurrence of the vertical synchronization signal HCv. What this process means is that the location of the synchronization adjustment signal SAS in the frame is calculated from the count value CTs, the phase difference is calculated on the basis of the result, and the phase with which the following vertical synchronization signal HCv is output (in the next frame or a subsequent frame) is adjusted on the basis of the calculated phase difference. Control (phase adjustment) based on the count value CTs may accordingly be referred to simply as control (phase adjustment) based on the phase difference.

The phase difference may be represented as a positive value when the vertical synchronization signal HCv leads the synchronization adjustment signal SAS and as a negative value when the vertical synchronization signal HCv lags the synchronization adjustment signal SAS; the absolute value, disregarding the positive or negative sign, may be referred to as the phase difference.

The following description will assume that synchronization adjustment data SAD are transmitted periodically, once per frame, and are generated in synchronization with the frame synchronization signal SYf (FIGS. 4(a) and 5(a)).

If the data transmission means 4 shifts the transmission timings irregularly to avoid transmission delays and delay variations due to traffic congestion, it may also transmit transmission time difference information TDD indicating the difference from the regular timing. This case, in which transmission time difference information TDD is added, will be described in more detail later.

It will be assumed here that the reference clocks LCK in the first to N-th display devices HS-1 to HS-N and the transmitting apparatus TA have frequencies made identical by clock synchronization using PCRs as described above; the intended frame length (the standard length of one frame) is denoted va in FIGS. 4(a) to 4(g) and 5(a) to 5(g), and the length v1 of the first frame is shown as being equal to va.

In FIG. 4(a), among the frame synchronization signals SYf, the signals generated for individual frames are indicated by reference characters t1 to t6; in FIG. 4(c), among the synchronization adjustment signals SAS, signals generated at particular timings are indicated by reference characters s1 to s6; in FIGS. 4(d) and 4(e), among the vertical synchronization signals HCv, signals generated at particular timings are indicated by reference characters h1 to h6. Similarly, in FIG. 5(a), among the frame synchronization signals SYf, the signals generated for individual frames are indicated by reference characters t1 to t5; in FIG. 5(c), among the synchronization adjustment signals SAS, signals generated at particular timings are indicated by reference characters s1 to s5; in FIGS. 5(d) and 5(e), among the vertical synchronization signals HCv, signals generated at particular timings are indicated by reference characters h0 to h5.

FIGS. 6(a) to 6(d) and 7(a) to 7(d) respectively illustrate the relationships between the phase difference tolerance range RPD and the count values CT given by the counter 71a in the first one-frame period and before and after that period in FIGS. 4(a) to 4(g) and 5(a) to 5(g). The counter 71a is used to count the vertical number of lines from a reset by the vertical synchronization signal HCv until detection of the next synchronization adjustment signal SAS. Accordingly, the vertical number of lines need not be counted after the synchronization adjustment signal SAS is detected, but FIGS. 4(a) to 7(d) (and FIGS. 8(a) to 13(h), described later) are drawn as if counting continues even after the detection of the synchronization adjustment signal SAS.

Instead of counting lines, the counter 71a may count pixels.

In FIGS. 6(a) to 6(d) and 7(a) to 7(d), the frame synchronization signal SYf, synchronization adjustment data SAD, and unadjusted vertical synchronization signal HCv are omitted, and the synchronization adjustment signals SAS, phase-adjusted vertical synchronization signals HCv, phase difference tolerance range RPD, and count value CT are shown.

For simplicity, it is assumed that there is no delay from the output of information or a signal indicating time by the system master clock 1 to generation of the synchronization adjustment data SAD in the data generation means 3, transmission of the synchronization adjustment data SAD from the data transmission means 4 to data reception means 6, and generation of a synchronization adjustment signal SAS from the synchronization adjustment data SAD in the synchronization adjustment signal generation means 63.

The phase tolerance range RPD described above consists of prescribed time spans preceding and following the vertical synchronization signal HCv; the values A and B defining the phase tolerance range RPD are set with allowance for transmission delay fluctuations in the network. Since the network itself produces varying transmission delays and clock synchronization using NTP has a tolerance of a few milliseconds, it makes no sense to perform adjustments with greater precision than that.

FIGS. 4(a) to 4(g) illustrate the case in which the unadjusted vertical synchronization signals HCv (h1 to h6) lead the synchronization adjustment signals SAS (s1 to s6) and (the absolute value of) the phase difference is d1.

It is assumed that for the first frame, the transmitting apparatus TA and display device HS-n both have the same frame length v1 (=va).

First, at time t1, the control signal generation means 71 calculates the phase difference d1 between the synchronization adjustment signal SAS (s1) output from the synchronization adjustment signal generation means 63 and the vertical synchronization signal HCv (h1). Specifically, it resets the counter 71a at the vertical synchronization signal HCv (h1) immediately before time t1, counts the number of subsequent vertical lines, and calculates the phase difference between the synchronization adjustment signal SAS (s1) and vertical synchronization signal HCv (h1) from the value of the count CTs when it receives the synchronization adjustment signal SAS (s1). If the calculated phase difference is outside the phase difference tolerance range RPD (d1 is outside the tolerance range RPD centered on the timing of the occurrence of the vertical synchronization signal HCv (h1) immediately before time t1), it decides that the synchronization adjustment signal SAS lags the vertical synchronization signal HCv by an excessive amount, or conversely, that the phase of the vertical synchronization signal HCv leads the phase of the synchronization adjustment signal SAS by an excessive amount, and makes the length v2 of the next frame (from h2 to h3) longer than the length v1 of the current frame (lengthens the interval between occurrences of the vertical synchronization signal HCv).

Specifically, the number of clocks CLK (number of clock cycles) from one occurrence of the vertical synchronization signal HCv to the next occurrence of the vertical synchronization signal HCv is increased. In other words, after the occurrence of a vertical synchronization signal HCv, the next vertical synchronization signal HCv is generated when an increased number of clocks have been generated.

The amount of lengthening (the adjustment width) may be a predetermined value or may be determined according to the detected phase difference (e.g., increased as the phase difference increases).

When a frame is lengthened, it is preferably lengthened by lengthening the vertical blanking interval or the horizontal blanking interval.

Similarly, at time t2, the phase difference between the synchronization adjustment signal SAS (s2) and vertical synchronization signal HCv (h2) is calculated, and if the vertical synchronization signal HCv (h2) still leads the synchronization adjustment signal SAS (s2) and the (adjusted) phase difference dim is still found to be outside the phase difference tolerance range RPD, the length v3 of the next frame (from h3 to h4) is made longer than v2.

Similarly, at time t3, the phase difference between the synchronization adjustment signal SAS (s3) and vertical synchronization signal HCv (h3) is calculated, and if the vertical synchronization signal HCv (h3) still leads the synchronization adjustment signal SAS (s3) and the (adjusted) phase difference dim is still found to be outside the phase difference tolerance range RPD, the length v3 of the next frame (from h4 to h5) is made longer than v3.

At time t4, the phase difference between the synchronization adjustment signal SAS (s4) and vertical synchronization signal HCv (h4) is calculated, and if the (adjusted) phase difference dim is found to be within the phase difference tolerance range RPD, the length v4 of the next frame (from h5 to h6) is left unchanged (the same as in the previous frame).

After that, as long as the phase difference between the synchronization adjustment signal SAS and the vertical synchronization signal HCv is within the phase difference tolerance range RPD, the frame length is kept at v4 (>v1), and as a result, the phase of the vertical synchronization signal HCv gradually retreats with respect to the phase of the synchronization adjustment signal SAS (changes in the lagging direction).

FIGS. 5(a) to 5(g) illustrate the case in which the unadjusted vertical synchronization signals HCv (h0 to h5) lag the synchronization adjustment signals SAS (s1 to s5) and (the absolute value of) the phase difference is d2.

It is assumed that for the first frame, the transmitting apparatus TA and display device HS-n both have the same frame length v1 (=va).

First, at time t1, the control signal generation means 71 calculates the phase difference d2 between the synchronization adjustment signal SAS (s1) output from the synchronization adjustment signal generation means 63 and the vertical synchronization signal HCv (h1). Specifically, it resets the counter 71a at the vertical synchronization signal HCv (h0) immediately before time t1, counts the number of subsequent vertical lines, and calculates the phase difference between the synchronization adjustment signal SAS (s1) and vertical synchronization signal HCv (h1) from the value of the count CTs when it receives the synchronization adjustment signal SAS (s1). If the calculated phase difference is outside the phase difference tolerance range RPD (d2 is outside the tolerance range RPD centered on the next occurrence timing of the vertical synchronization signal HCv (h1) after time t1), it decides that the synchronization adjustment signal SAS leads the vertical synchronization signal HCv by an excessive amount, i.e., that the phase of the vertical synchronization signal HCv lags the synchronization adjustment signal SAS by an excessive amount, and makes the length v2 of the next frame (from h1 to h2) shorter than the length v1 of the current frame (shortens the interval between occurrences of the vertical synchronization signal HCv).

Specifically, the number of clocks CLK (number of clock cycles) from one occurrence of the vertical synchronization signal HCv to the next occurrence of the vertical synchronization signal HCv is reduced. In other words, after the occurrence of a vertical synchronization signal HCv, the next vertical synchronization signal HCv is generated when a reduced number of clocks have been generated.

The amount of the reduction (the adjustment width) may be a predetermined value or may be determined according to the detected phase difference (e.g., increased as the phase difference increases).

When a frame is shortened, it is preferably shortened by shortening the vertical blanking interval or the horizontal blanking interval.

Similarly, at time t2, the phase difference between the synchronization adjustment signal SAS (s2) and vertical synchronization signal HCv (h2) is calculated, and if the vertical synchronization signal HCv (h2) still lags the synchronization adjustment signal SAS (s2) and the (adjusted) phase difference d2m is still found to be outside the phase difference tolerance range RPD, the length v3 of the next frame (from h2 to h3) is made shorter than v2.

Similarly, at time t3, the phase difference between the synchronization adjustment signal SAS (s3) and vertical synchronization signal HCv (h3) is calculated, and if the vertical synchronization signal HCv (h3) still lags the synchronization adjustment signal SAS (s3) and the (adjusted) phase difference d2m is still found to be outside the phase difference tolerance range RPD, the length v4 of the next frame (from h3 to h4) is made shorter than v3.

At time t4, the phase difference between the synchronization adjustment signal SAS (s4) and vertical synchronization signal HCv (h4) is calculated, and if the (adjusted) phase difference d2m is found to be within the phase difference tolerance range RPD, the length v4 of the next frame (from h4 to h5) is left unchanged (the same as in the previous frame).

After that, as long as the phase difference between the synchronization adjustment signal SAS and the vertical synchronization signal HCv is within the phase difference tolerance range RPD, the frame length is kept at v4 (<v1), and as a result, the phase of the vertical synchronization signal HCv gradually advances with respect to the phase of the synchronization adjustment signal SAS (changes in the leading direction).

As described above, it is possible to limit the phase difference between the vertical synchronization signal HCv and the synchronization adjustment signal SAS to within a prescribed range (within the phase difference tolerance range RPD), by delaying the occurrence of the vertical synchronization signal HCv when the phase of the vertical synchronization signal HCv leads the phase of the synchronization adjustment signal SAS, and conversely, by advancing the occurrence of the vertical synchronization signal HCv when the phase of the vertical synchronization signal HCv lags the phase of the synchronization adjustment signal SAS.

As described above, in the examples shown in FIGS. 4(a) to 4(g) and 5(a) to 5(g), whether or not the calculated phase difference is within the tolerance range RPD is determined from whether or not the count value CTs of the counter 71a when the display device HS-n receives the synchronization adjustment signal SAS satisfies $$F-B \leq CTs \quad (F1)$$

or $$CTs \leq A \quad (F2)$$

If inequality (F1) or (F2) is satisfied, it is decided that the phase difference is within the tolerance range RPD; otherwise, it is decided that the phase difference is outside the tolerance range RPD.

F is here the intended vertical total number of lines (before the increasing and decreasing operations described above is carried out), and A and B are positive integers, not exceeding 0.5×F, that are preset in consideration of the horizontal synchronization interval, and the vertical front porch and vertical back porch intervals (of time).

Specifically, A and B are set at values of about ⅛ to ¼ of F. That is, A and B are set at count values corresponding to the lengths At and Bt, which are ⅛ to ¼ the length of a frame. The set values of A and B are stored in each display device HS-n: for example, in its image reproduction/updating control means 7.

The following description will assume that CT, F, A, and B are numbers of lines or set values corresponding to numbers of lines, but they may be numbers of clocks CLK or set values corresponding thereto.

The phase difference tolerance range is not limited to the above; it may be determined according to the frame rate of the images displayed on the display devices or the network transmission delay.

If the condition $$0.5 \times F < CTs < F-B$$

is satisfied, it is decided that the phase difference is outside the tolerance range RPD and the vertical synchronization signals HCv lag the synchronization adjustment signals SAS; if the condition $$A < CTs < 0.5 \times F$$

is satisfied, it is decided that the phase difference is outside the tolerance range RPD and the vertical synchronization signals HCv lead the synchronization adjustment signals SAS.

Each of the first to N-th display devices HS-1 to HS-N can use the synchronization adjustment data SAD generated by the system master clock 1 in the transmitting apparatus TA to keep the image update timing (vertical synchronization signal HCv) within a fixed phase difference range with respect to the synchronization adjustment signal SAS output from the synchronization adjustment signal generation means 63 in the data reception means 6, so that, as a result, the image update timings among the image display means 8 in the first to N-th display devices HS-1 to HS-N can also be kept within a fixed phase difference range. If the image update timing in each display device HS-n is controlled with the goal of keeping it within the tolerance range RPD (within ±HRP), the phase difference between the image update timings of any two display devices will be kept within the tolerance range RPD (within twice HRP).

In FIGS. 4(a) to 4(g) and 5(a) to 5(g), the result of the calculation of the phase difference between the synchronization adjustment signal SAS and vertical synchronization signal HCv is directly reflected in the next frame; an alternative scheme that may be used is to increase or decrease the phase difference when the average phase difference in a given period (the average over a prescribed number of frames) goes outside the phase difference tolerance range or when a given number of consecutive phase differences are outside the phase difference tolerance range and have the same positive/negative sign.

Next, the case in which transmission of the synchronization adjustment data SAD is delayed so as not to be affected by transmission delays due to traffic congestion will be described. For system convenience, it is desirable for the data transmission means 4 in the transmitting apparatus TA to transmit the synchronization adjustment data SAD at the same timing and with the same phase relationship as the image update timing in each of the first to N-th display devices HS-1 to HS-N, but in some cases the synchronization adjustment data SAD cannot be transmitted at the desired timing because it overlaps the transmission timing of the image data (with reproduction control information) VCD. In this case, it is possible to transmit the synchronization adjustment data SAD together with transmission time difference information TDD reporting the amount by which the transmission of the data has been delayed, and then make up for the delay.

FIGS. 8(a) to 8(h), 9(a) to 9(h), and 10(a) to 10(h) show the operation in the case in which synchronization adjustment data SADa ((b) in these diagrams) should have been transmitted at time to in synchronization with a frame synchronization signal SYf ((a) in these diagrams), but instead, synchronization adjustment data SADb ((c) in these diagrams) are transmitted at a time tb after the elapse of a delay time Dt, with different values of the delay time Dt. The count value (the increment of the count value) corresponding to the delay time Dt is denoted D and the transmission time difference information is denoted by reference characters TDD. The delay time Dt is assumed to be shorter than the length of one frame; accordingly, D<F. The synchronization adjustment signals SAS corresponding to the synchronization adjustment data SADa and SADb will be denoted by reference characters SASa and SASb, respectively.

FIGS. 8(a) to 8(h) show the case in which D−B≥0 and D+A≤F (that is, B≤D≤F−A), and D>0.5×F;

FIGS. 9(a) to 9(h) show the case in which D−B<0 and D+A<F (that is, D<B and D<F−A); and FIGS. 10(a) to 10(h) show the case in which D−B≥0 and D+A>F (that is, D≥B and D>F−A).

In all of FIGS. 8(a) to 8(h), 9(a) to 9(h), and 10(a) to 10(h) the vertical synchronization signal HCv leads synchronization adjustment signal SASa.

Again, for simplicity of description, it is assumed that there is no delay from the output of information or a signal indicating time by the system master clock 1 to generation of the synchronization adjustment data SAD in the data generation means 3, transmission of the synchronization adjustment data SAD from the data transmission means 4 to data reception means 6, and generation of a synchronization adjustment signal SAS from the synchronization adjustment data SAD in the synchronization adjustment signal generation means 63.

When there is no transmission delay, i.e., Dt=0, as described with reference to FIGS. 4(a) to 4(g) to FIGS. 7(a) to 7(d), if the inequality (F1) or (F2) is satisfied, it is decided that the phase difference is within the tolerance range RPD.

Inequality (F1) is satisfied only when the vertical synchronization signal HCv lags the synchronization adjustment signal SAS (FIGS. 5(a) to 5(g)); inequality (F2) is satisfied only when the vertical synchronization signal HCv leads the synchronization adjustment signal SAS (FIGS. 4(a) to 4(g)).

When there is a transmission delay, i.e., Dt>0, it is also necessary to use formulas with values shifted by the count value D corresponding to the transmission delay Dt as formulas for determining whether or not the phase difference between the synchronization adjustment signal and the vertical synchronization signal HCv is within the tolerance range RPD. Specifically, when $$D-B \geq 0$$

and $$D+A \leq F$$

(that is, B≤D≤F−A), as in FIGS. 8(a) to 8(h), if $$D-B \leq CTs \leq D+A \quad \text{(F3)}$$

is satisfied, the phase difference between the synchronization adjustment signal SASa (s1) and vertical synchronization signal HCv (h1) is decided to be within the tolerance range RPD.

If the condition $$D-0.5 \times F < CTs < D-B$$

is satisfied when D>0.5×F, or if the condition $$D+0.5 \times F < CTs < F$$

or $$0 < CTs < D-B$$

is satisfied when D≤0.5×F, it is decided that the phase difference between the synchronization adjustment signal SASa (s1) and vertical synchronization signal HCv (h1) is outside the tolerance range RPD and that the vertical synchronization signal HCv (h1) lags the synchronization adjustment signal SASa (s1). If the condition $$D+A < CTs < F$$

or $$CTs < D-0.5 \times F$$

is satisfied when D>0.5×F, or if the condition $$D+A < CTs < D+0.5 \times F$$

is satisfied when D≤0.5×F, it is decided that the phase difference between the synchronization adjustment signal SASa (s1) and vertical synchronization signal HCv (h1) is outside the tolerance range RPD and that (as shown in FIGS. 8(d) and 8(f)) the vertical synchronization signal HCv (h1) leads the synchronization adjustment signal SASa (s1).

As shown in FIGS. 9(a) to 9(h), when D−B<0 and D+A<F (in this case, since B is less than ¼ of F, as described above, D is less than 0.5×F), if the condition $$D-B+F \leq CTs < F \quad \text{(F4)}$$

or $$0 \leq CTs \leq D+A \quad \text{(F5)}$$

is satisfied, it is decided that the phase difference between the synchronization adjustment signal SASa (s1) and vertical synchronization signal HCv (h1) is within the tolerance range RPD.

If the condition $$D+0.5 \times F < CTs < D-B+F$$

is satisfied, it is decided that the phase difference between the synchronization adjustment signal SASa (s1) and vertical synchronization signal HCv (h1) is outside the tolerance range RPD, and that the vertical synchronization signal HCv lags the synchronization adjustment signal SASa, and if $$D+A < CTs < D+0.5 \times F$$

is satisfied, it is decided that the phase difference is outside the tolerance range RPD, and that the vertical synchronization signal HCv leads the synchronization adjustment signal SAS.

As shown in FIGS. 10(a) to 10(h), when D−B≥0 and D>F−A (in this case, since A is less than ¼ of F, as described above, D is greater than 0.5×F), if the condition $$D-B \leq CTs < F \quad \text{(F6)}$$

or $$0 \leq CTs \leq D+A-F \quad \text{(F7)}$$

is satisfied, it is decided that the phase difference is within the tolerance range.

If the condition $$D-0.5\times F<CTs<D-B$$

is satisfied, it is decided that the phase difference is outside the tolerance range, and that the vertical synchronization signal HCv lags the synchronization adjustment signal SAS, and if the condition $$D+A-F<CTs<D-0.5\times F$$

is satisfied, it is decided that the phase difference is outside the tolerance range, and that the vertical synchronization signal HCv leads the synchronization adjustment signal SAS.

When traffic congestion is known in advance, the synchronization adjustment data SAD may be transmitted early, as shown in FIGS. 11(a) to 11(h), 12(a) to 12(h), and 13(a) to 13(h), instead of being delayed. In this case, the transmission time difference information TDD transmitted together with the synchronization adjustment data SAD indicates the transmission lead time. When the transmission is transmitted in advance by time Et, for example, it is also necessary to use formulas with values shifted by a count value E corresponding to the transmission lead time Et as formulas for determining whether or not the phase difference is within the tolerance range. The transmission lead time Et (like the transmission delay time Dt) is assumed here to be shorter than the length of one frame; accordingly, E<F.

FIGS. 11(a) to 11(h) show the case in which F−E−B≥0, that is, E+B≤F, and 0≤F−E+A≤F, that is, 0≤E−A, and E<0.5×F;

FIGS. 12(a) to 12(h) show the case in which F−E−B<0, that is, E+B>F, and F−E+A<F, that is, E−A>0; and FIGS. 13(a) to 13(h) show the case in which F−E−B>0, that is, E+B<F, and F−E+A>F, that is, A−E>0.

In all of FIGS. 11(a) to 11(h), 12(a) to 12(h), and 13(a) to 13(h) the vertical synchronization signal HCv leads synchronization adjustment signal SASa.

As shown in FIGS. 11(a) to 11(h), when F−E−B≥0, that is, E+B≤F, and 0≤F−E+A≤F, that is, 0≤E−A, if the condition $$F-E-B\leq CTs\leq F-E+A \quad (F8)$$

is satisfied, it is decided that the phase difference between the synchronization adjustment signal SASa (s1) and vertical synchronization signal HCv (h1) is within the tolerance range RPD. If the condition $$0.5\times F-E<CTs<F-E-B$$

is satisfied when E≤0.5×F, or the condition $$1.5\times F-E<CTs<F$$

or $$0<CTs<F-E-B$$

is satisfied when E>0.5×F, it is decided that the phase difference between the synchronization adjustment signal SASa (s1) and vertical synchronization signal HCv (h1) is outside the tolerance range RPD, and that the vertical synchronization signal HCv (h1) lags the synchronization adjustment signal SASa (s1). If the condition $$F-E+A<CTs<F$$

or $$0<CTs<0.5\times F-E$$

is satisfied when E≤0.5×F, or if the condition $$F-E+A<CTs<1.5\times F-E$$

is satisfied when E>0.5×F, it is decided that the phase difference between the synchronization adjustment signal SASa (s1) and vertical synchronization signal HCv (h1) is outside the tolerance range RPD, and that the vertical synchronization signal HCv (h1) leads the synchronization adjustment signal SASa (s1).

As shown in FIGS. 12(a) to 12(h), when F−E−B<0, that is, E+B>F, and F−E+A<F, that is, E−A>0 (in this case, as described above, B is smaller than ¼ of F, so that E is greater than 0.5×F), if the condition $$2\times F-E-B\leq CTs<F$$

or $$0\leq CTs\leq F-E+A$$

is satisfied, it is decided that the phase difference between the synchronization adjustment signal SASa (s1) and vertical synchronization signal HCv (h1) is within the tolerance range RPD.

If the condition $$1.5\times F-E\leq CTs<2\times F-E-B$$

is satisfied, it is decided that the phase difference between the synchronization adjustment signal SASa (s1) and vertical synchronization signal HCv (h1) is outside the tolerance range RPD, and that the vertical synchronization signal HCv lags the synchronization adjustment signal SAS. If the condition $$F-E+A<CTs<1.5\times F-E$$

is satisfied, it is decided that the phase difference between the synchronization adjustment signal SASa (s1) and vertical synchronization signal HCv (h1) is outside the tolerance range RPD, and that the vertical synchronization signal HCv leads the synchronization adjustment signal SAS.

As shown in FIGS. 13(a) to 13(h), when F−E−B>0, that is, E+B<F, and F−E+A>F, that is, A−E>0 (in this case, as described above, A is smaller than ¼ of F, so that E is smaller than 0.5×F), if the condition $$F-E-B\leq CTs<F$$

or $$0<CTs\leq A-E \quad (F9)$$

is satisfied, it is decided that the phase difference between the synchronization adjustment signal SASa (s1) and vertical synchronization signal HCv (h1) is within the tolerance range RPD.

If the condition $$0.5\times F-E<CTs<F-E-B$$

is satisfied, it is decided that the phase difference between the synchronization adjustment signal SASa (s1) and vertical synchronization signal HCv (h1) is outside the tolerance range RPD, and that the vertical synchronization signal HCv lags the synchronization adjustment signal SAS.

If the condition $$A-E<CTs<0.5\times F-E$$

is satisfied, it is decided that the phase difference between the synchronization adjustment signal SASa (s1) and vertical synchronization signal HCv (h1) is outside the tolerance range RPD, and that the vertical synchronization signal HCv leads the synchronization adjustment signal SAS.

The counter is not limited to a counter for counting the vertical number of lines; it may be a counter for counting the number of clock pulses generated by the local clock generation means 10, or a timer for outputting time data. It need not necessarily be reset by the vertical synchronization signal HCv; the difference between the count value at input of the vertical synchronization signal HCv and the count value at input of the synchronization adjustment signal SAS may be determined instead.

As described above, based on the system master clock 1 in the transmitting apparatus TA, the data generation means 3 generates the synchronization adjustment data SAD; based on the generated synchronization adjustment data SAD, the synchronization adjustment signal generation means 63 in the data reception means 6 in the first and N-th display devices HS-1 to HS-N generates a synchronization adjustment signal SAS; and in the control signal generation means 71 in the image reproduction/updating control means 7, the image display control signals HC for determining the update timings of the images RV reproduced on the image display means 8 is adjusted so that its phase relationship with the synchronization adjustment signal SAS is kept within a certain range (the phase difference tolerance range), so that differences in the update timings of the reproduced images RV among the first to N-th display devices HS-1 to HS-N can be kept within a fixed range.

By using at least one of the horizontal synchronization signal HCh and the vertical synchronization signal HCv as an image display control signal HC and controlling (increasing or decreasing) the period of the horizontal synchronization signal HCh and/or vertical synchronization signal HCv (the number of dots (horizontal total number of pixels) of each line and/or the number of lines (vertical total number of lines) of each frame) the update timings of reproduced images RV can be gradually delayed or advanced. In order to increase or decrease the number of dots of each line, for example, the length of the horizontal blanking interval may be changed by increasing or decreasing the number of non-effective dots, or in order to increase or decrease the number of lines of each frame, for example, the length of the vertical blanking interval may be changed by increasing or decreasing the number of non-effective lines.

Increasing or decreasing the number of dots (the number of pixels) means to increase or decrease the number of dot clocks (the number of clock cycles) supplied as synchronization signals for the output of the pixel signals in each line. Increasing or decreasing the number of lines means to increase or decrease the value obtained by dividing the number of dot clocks (the number of clock cycles) generated in each frame interval by the number of dot clocks generated for the pixels in each line.

Both when the local clock LCK is used directly as the dot clock and when the dot clock is generated from the local clock LCK (e.g., by frequency division), increasing or decreasing the number of dot clocks generated during each of the above intervals means to increase or decrease the number of local clocks LCK generated during each of the above intervals.

Increasing or decreasing the period of the horizontal synchronization signal HCh and/or the vertical synchronization signal HCv as described above enables the difference to be corrected and synchronization to be maintained within a fixed range downstream of the reproduction process, without affecting the reproduction process (decoding process), at a rate gradual enough so as not to be visible on the image display means 8.

If phase control is carried out in each display device with the goal of keeping the phase in the tolerance range RPD (within ±HRP), the difference (phase difference) between the image update timings of two display devices becomes RPD (HRP×2) at maximum.

Instead of generating the synchronization adjustment signal SAS immediately when the synchronization adjustment data SAD are received as described above, a temporal difference or phase difference may be introduced into the timing of generation of the synchronization adjustment signal SAS with respect to the timing of reception of the synchronization adjustment data SAD. The phase difference may be identical among the display devices, may differ from one device to another, or may have a value that varies over time: for example, a value that changes in each frame. This phase difference is used as a control target, so that it is also referred to as a target phase difference.

By using different target phase differences for different display devices, it is possible to vary the image update timing among the display devices. For example, by giving two different display devices (individually denoted by reference characters HS-i and HS-j) mutually different target phase differences TPDi and TPDj, the image update timings on the two display devices are controlled to correspond to a phase difference ΔTPD equal to TPDi−TPDj.

The phase differences may differ among the plurality of display devices so that the images are updated sequentially (the display content on the plurality of display devices switches sequentially, at different times), and the display of content may be coordinated among the plurality of display devices in this way. One example is to temporally offset the updating of display content on a plurality of display devices placed along a moving sidewalk.

Since synchronization of the update timings of the reproduced image RV is kept within a fixed range according to the degree of variation of transmission delay on the network and no excessive control is carried out, adverse effects of such variation on the update timings can be suppressed.

The transmission timing of the synchronization adjustment data SAD from the transmitting apparatus TA can be adjusted according to the traffic status of the network. Thus it is possible to transmit synchronization adjustment data SAD at times in between and not affecting the transmission of the image data (with reproduction control information) VCD, when traffic is comparatively light and the processing load is small, thereby enabling transmission and reception with limited transmission delay.

In the example above, the synchronization adjustment signal SAS is described as being generated in the synchronization adjustment signal generation means 63 in a display device HS-n every time synchronization adjustment data SAD are supplied (accordingly, once per frame), but this is not a limitation; the synchronization adjustment signal SAS may be generated less frequently than the synchronization adjustment data SAD are supplied. For example, a synchronization adjustment signal SAS may be generated once every fixed number of times (two or more times) the synchronization adjustment data SAD are supplied.

Instead of generating the synchronization adjustment data SAD once per frame, the data generation means 3 in the transmitting apparatus TA may generate the synchronization adjustment data SAD once per multiple frames, for example; instead of transmitting the synchronization adjustment data SAD once per frame, the data transmission means 4 may transmit the data once per multiple frames. When the data are transmitted once per multiple frames, the synchronization adjustment signal generation means 63 in the display device HS-n may generate a synchronization adjustment signal SAS once per frame from the synchronization adjustment data SAD transmitted once per multiple frames.

In addition, detection of the phase difference between the synchronization adjustment signal SAS and the vertical synchronization signal HCv (and phase adjustment of the vertical synchronization signal HCv based on the detection result) may be carried out at intervals equal to a plural multiple of the interval between vertical adjustment signals HCv. The interval equal to a plural multiple of the interval between vertical adjustment signals HCv may be the interval at which the synchronization adjustment signal SAS is generated, the synchronization adjustment signal SAS then being generated less frequently than the vertical synchronization signal HCv.

To generalize, detection of the phase difference between the synchronization adjustment signal SAS and vertical synchronization signal HCv may be performed with a period of M (M being 1 or a greater integer) times the period of the vertical synchronization signal HCv. When M is 2 or greater, the phase difference between the every M-th vertical synchronization signal HCv and the synchronization adjustment signal SAS is detected.

ZC

Second Embodiment

Figure 14:
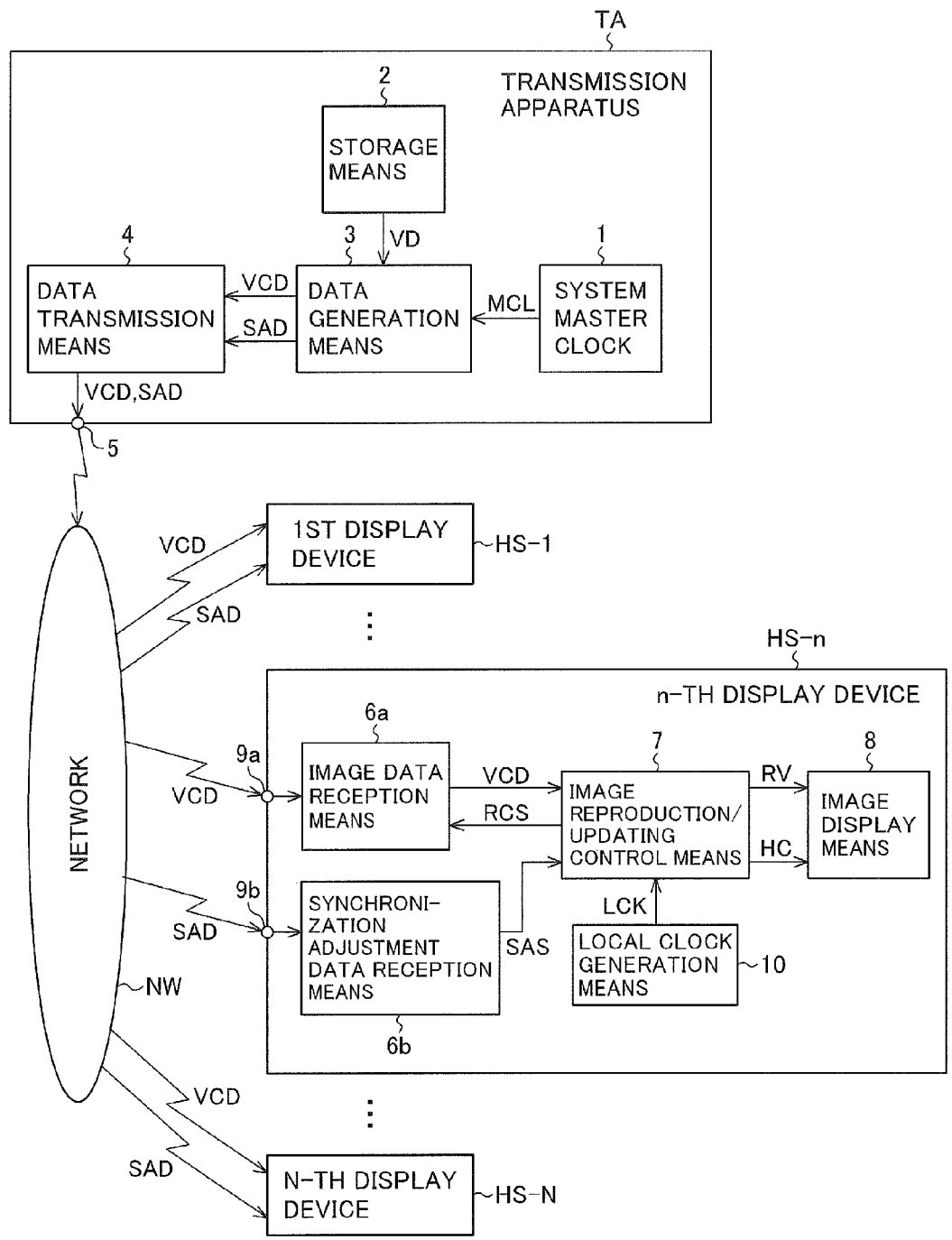
FIG. 14 is a block diagram showing the main components of a multi-screen display system according to a second embodiment of the invention.

FIG. 14 is a block diagram showing the main components of the multi-screen display system according to the second embodiment of the invention. The structure is similar to that of the multi-screen display system according to the first embodiment shown in FIG. 1, but differs in that the data reception means 6 in each of the first to N-th display devices HS-1 to HS-N includes an image data reception means 6a and a synchronization adjustment data reception means 6b, and the input terminals 9 include input terminals 9a and 9b. Parts having the same functions as in the first embodiment have the same reference characters.

The image data reception means 6a temporarily stores the image data (with reproduction control information) VCD input from input terminal 9a in a buffer, and outputs the data to the image reproduction/updating control means 7 responsive to a read control signal RCS from the image reproduction/updating control means 7.

The synchronization adjustment data reception means 6b receives synchronization adjustment data SAD from input terminal 9b, then generates a synchronization adjustment signal SAS, and outputs it to the image reproduction/updating control means 7.

Figure 15:
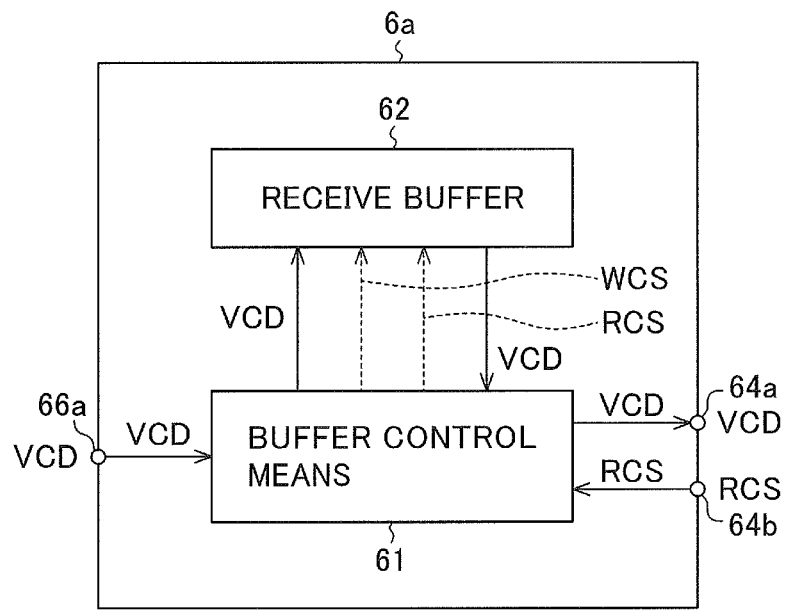
FIG. 15 is a block diagram showing the main components of the image data reception means 6a in FIG. 14.

FIG. 15 is a block diagram showing the main components of the image data reception means 6a. Input terminal 66a, unlike input terminal 66 in the data reception means 6 in the first embodiment, receives the image data (with reproduction control information) VCD.

Figure 16:
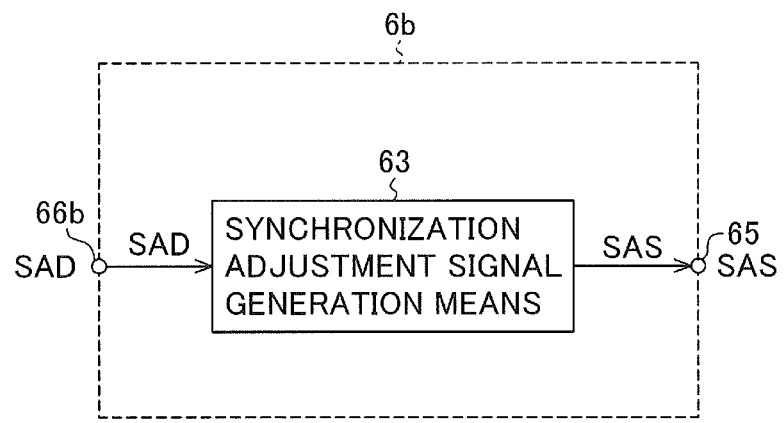
FIG. 16 is a block diagram showing the main components of the synchronization adjustment data reception means 6b in FIG. 14.

FIG. 16 is a block diagram showing the main components of the synchronization adjustment data reception means 6b. Unlike input terminal 66 of the data reception means 6 in the first embodiment, input terminal 66b receives the synchronization adjustment data SAD.

The image data (with reproduction control information) VCD which the image data reception means 6a receives via input terminal 9a constitute a relatively large amount of data, which only has to be stored in the receive buffer 62 in the image data reception means 6a (described as a video-system process) by the reproduction time indicated in the reproduction control information RCD. In contrast, the synchronization adjustment data SAD, which the synchronization adjustment data reception means 6b receives via input terminal 9b, constitute a smaller amount of data, but are used to generate the synchronization adjustment signal SAS for adjusting the update timing of the reproduced image RV (described as a control-system process), so that the delay must be minimized.

By separating the system into a video system and a control system having mutually different characteristics (requirements for transmission and processing) as described above, control-system processes can be kept from being delayed due to the image-system processing load, and factors inhibiting the synchronization of the update timings of the reproduced images RV among the first to N-th display devices HS-1 to HS-N can be eliminated and reduced.

Figure 17:
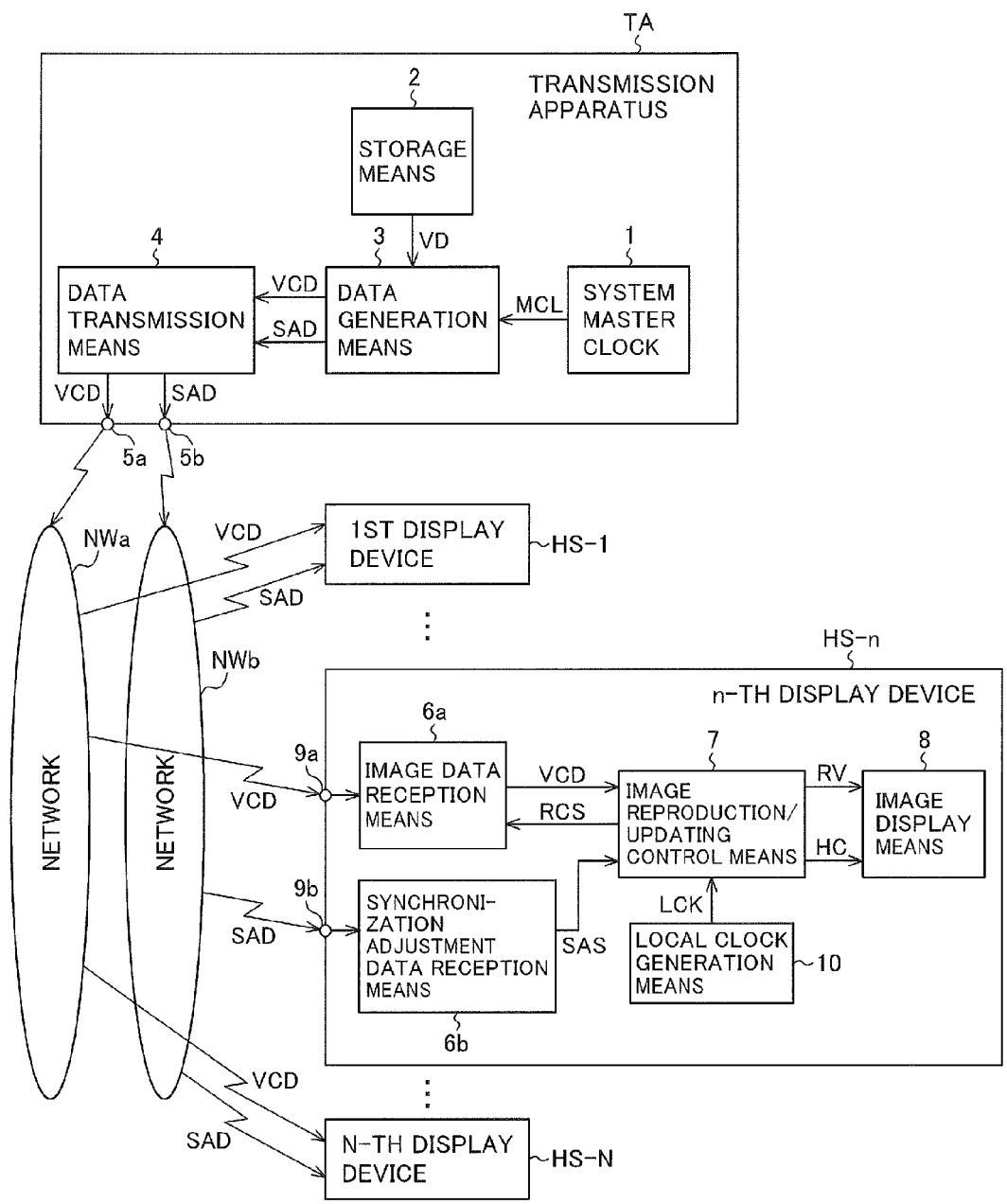
FIG. 17 is a block diagram showing a variation of the multi-screen display system in the second embodiment.

As a variation, as shown in FIG. 17, the network NW may be divided into a network NWa for transmitting image-system process data and a network NWb for transmitting control-system process data, the image data (with reproduction control information) VCD output from the data transmission means 4 being transmitted via output terminal 5a and network NWa to the display devices, the synchronization adjustment data SAD being transmitted via output terminal 5b and network NWb to the display devices. A greater effect can be obtained in this structure by selecting networks and protocols corresponding to the characteristics of the data transmitted, e.g., by employing a high-bandwidth network as network NWa for transmission of the image data (with reproduction control information) VCD and employing a low-delay network or a network with low delay variation as network NWb for transmission of the synchronization adjustment data SAD.

Third Embodiment

Figure 18:
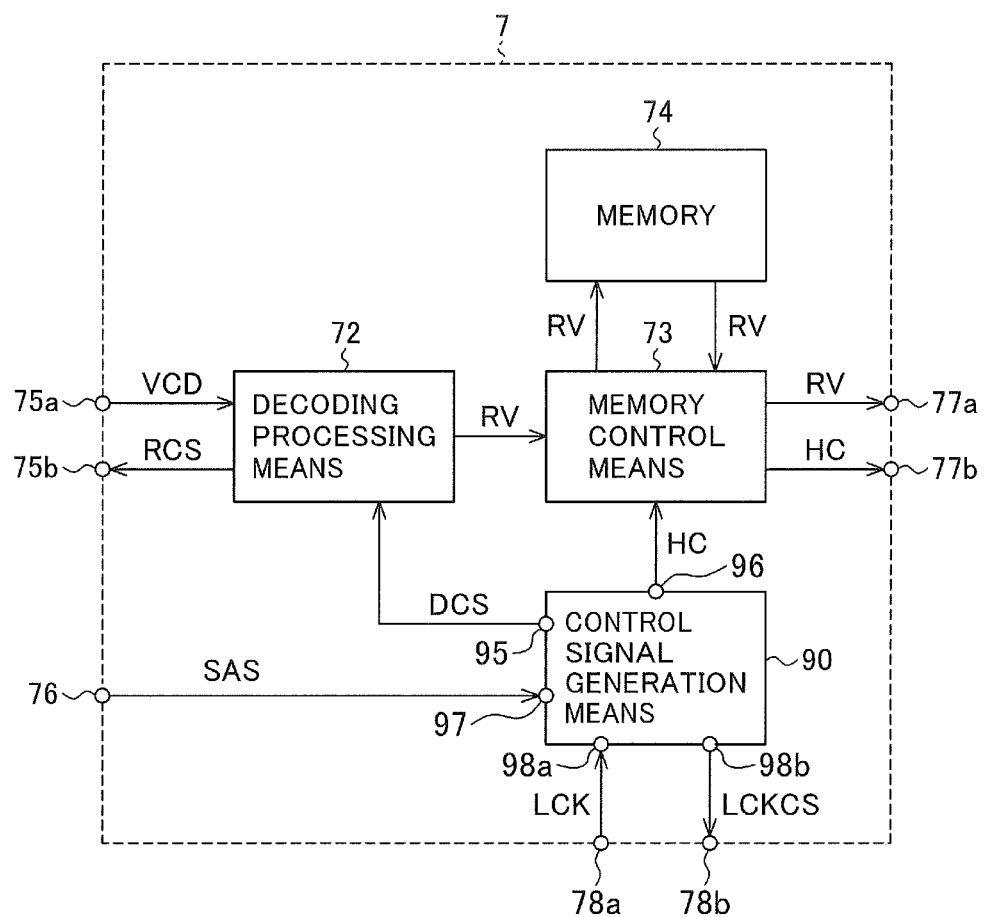
FIG. 18 is a block diagram showing the main components of the image reproduction/updating control means 7 according to a third embodiment.

FIG. 18 is a block diagram showing the main components of the image reproduction/updating control means 7 in the multi-screen display system according to the third embodiment of the invention. The image reproduction/updating control means 7 in FIG. 18 is similar in structure to the image reproduction/updating control means 7 shown in FIG. 3, but differs in that the control signal generation means 71 in FIG. 3 is replaced with a control signal generation means 90.

A local clock control signal LCKCS generated in the control signal generation means 90 as described later is output to the local clock generation means 10, and a reference clock LCK generated in the local clock generation means 10 is input to the control signal generation means 90.

Figure 19:
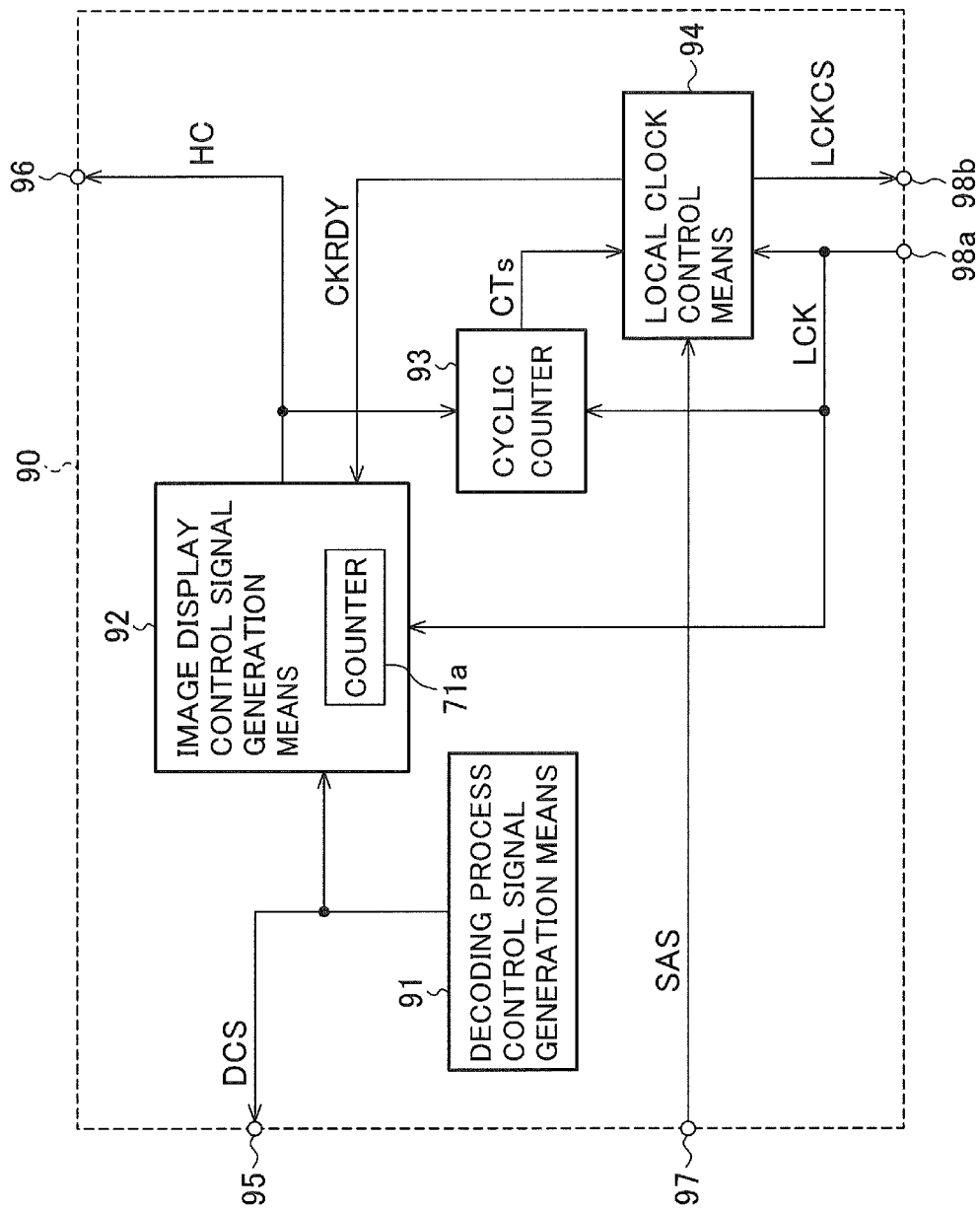
FIG. 19 is a block diagram showing the main components of the control signal generation means 90 according to the third embodiment.

The control signal generation means 90 includes, for example, a decoding process control signal generation means 91, an image display control signal generation means 92, a cyclic counter 93, a local clock control means 94, input terminals 97, 98a, and output terminals 95, 96, 98b as shown in FIG. 19. Terminals 98a and 98b are connected to terminals 78a and 78b, respectively.

The decoding process control signal generation means 91 outputs a decoding process control signal DCS that it generates based on the clock LCK generated by the local clock generation means 10 to the decoding processing means 72 via the output terminal 95.

The image display control signal generation means 92 includes a counter 71a similar to the counter 71a described in the first embodiment, counts local clocks LCK input via input terminal 98a from the local clock generation means 10, and generates image display control signals HC based on the decoding process control signal DCS output from the decoding process control signal generation means 91 and a clock ready signal CKRDY output from the local clock control means 94.

The image display control signals HC include a vertical synchronization signal HCv, a horizontal synchronization signal HCh, and a dot clock DCK. The vertical synchronization signal HCv and horizontal synchronization signal HCh are generated by counting of the clocks LCK by the counter 71a.

The vertical synchronization signal HCv, horizontal synchronization signal HCh, and dot clock DCK are supplied to the memory control means 73 via output terminal 96. The image display control signals HC are generated from the local clock LCK, so that the phase (output timing) of the image display control signals HC can be controlled by controlling the local clock frequency.

The vertical synchronization signal HCv is also supplied to the cyclic counter 93.

The cyclic counter 93 is a cyclic counter with a period T, which counts the local clocks LCK input from the local clock generation means 10 via input terminal 98a.

The cyclic counter 93 receives the image display control signals HC from the image display control signal generation means 92 and outputs the count value CT to the local clock control means 94.

Before image reproduction/update processing (i.e., before time T2), period T is the period $T_{SAD}$ established by the transmitting apparatus TA and the n-th display device HS-n as the transmission period of the synchronization adjustment data SAD output from the transmitting apparatus TA, and accordingly, counting is repeated until the count value $CT_{SAD}$ corresponding to this period $T_{SAD}$ is reached.

After the start of the image reproduction/update processing ready state (time T2), period T is M (M being a positive integer) times the period $T_{HCv}$ of the image display control signals HC (vertical synchronization signal HCv) input form the image display control signal generation means 92.

When period $T_{HCv}$ equals period $T_{SAD}$, the count value $CT_{HCv}$ (=F) used after time T2 equals the count value $CT_{SAD}$ before time T2.

The local clock control means 94 generates a local clock control signal LCKCS based on the count value CT input from the cyclic counter 93 and the synchronization adjustment signal SAS input via input terminal 97, and outputs the generated signal to the local clock generation means 10 via output terminal 98b. It also outputs a clock ready signal CKRDY to the image display control signal generation means 92.

Next, a process for controlling the phase of the image display control signals HC output from the image reproduction/updating control means 7 to the image display means 8 according to the synchronization adjustment signal SAS output from the synchronization adjustment signal generation means 63 in the data reception means 6 in each of the first to N-th display devices HS-1 to HS-N, based on the synchronization adjustment data SAD output from the transmitting apparatus TA, will be described with reference to FIGS. 4(*a*) to 4(*g*), 5(*a*) to 5(*g*), and 20(*a*) to 20(*e*). The following description will deal mainly with the operation of the transmitting apparatus TA and the n-th display device HS-n, which is any one of the first to N-th display devices.

In the first embodiment the reference characters CT, F, A, B, etc. in FIGS. 4(*a*) to 4(*g*) and 5(*a*) to 5(*g*) indicated numbers of lines, or set values corresponding to numbers of lines, but in the third embodiment they indicate numbers of clocks CLK or corresponding set values. This also applies to FIGS. 20(*a*) to 20(*e*) and 21(*a*) to 21(*e*).

The synchronization adjustment data SAD shown in FIGS. 4(*b*) and 5(*b*) are generated and output in the data generation means 3 at periodic timings based on the system master clock 1 in the transmitting apparatus TA.

The synchronization adjustment data SAD are transmitted from the transmitting apparatus TA to the display devices HS-1 to HS-N, in which a synchronization adjustment signal SAS (FIGS. 4(*c*) and 5(*c*)) is generated based on the received synchronization adjustment data SAD; the synchronization adjustment signal SAS is compared with the vertical synchronization signals HCv (FIGS. 4(*d*) and 5(*d*)); if the phase difference between them is outside the tolerance range RPD (FIGS. 4(*f*) and 5(*f*)), the phase of the vertical synchronization signal HCv (FIGS. 4(*d*) and 5(*d*)) is adjusted.

Whether or not the phase difference between the synchronization adjustment signal SAS and the vertical synchronization adjustment signal HCv is within the tolerance range is determined from the count value CT (FIGS. 4(*g*) and 5(*g*)) given by the cyclic counter 93, in the local clock control means 94 of the control signal generation means 90 in each display device as described later. That is, whether or not the phase difference between the synchronization adjustment signal SAS and vertical synchronization signal HCv is within the tolerance range RPD is determined from the value of the count CTs given by the cyclic counter 93 when the synchronization adjustment signal SAS is received; if the phase difference is outside the tolerance range, then whether the vertical synchronization signal HCv leads or lags the synchronization adjustment signal SAS is determined; the output phase of the following vertical synchronization signal HCv (in the next frame or a subsequent frame) is then adjusted according to the result of this determination. Unlike the first embodiment, the third embodiment adjusts the output phase of the vertical synchronization signal HCv by controlling the frequency of the local clock LCK, thereby controlling the phase difference so that it is kept within a prescribed range.

What this process means is that the location of the synchronization adjustment signal SAS in the frame is calculated from the count value CTs, the phase difference is calculated on the basis of the result, and the phase at which the following vertical synchronization signal HCv is output (in the next frame or a subsequent frame) is adjusted on the basis of the calculated phase difference. Control (phase adjustment) based on the count value CTs may accordingly be referred to simply as control (phase adjustment) based on the phase difference.

The phase difference may be represented as a positive value when the vertical synchronization signal HCv leads the synchronization adjustment signal SAS and as a negative value when the vertical synchronization signal HCv lags the synchronization adjustment signal SAS; the absolute value, disregarding the positive or negative sign, may be referred to as the phase difference.

The following description will assume that synchronization adjustment data SAD are transmitted periodically, once per frame, and are generated in synchronization with the frame synchronization signal SYf (FIGS. 4(*a*) and 5(*a*)), but this is not a limitation; generally speaking, the transmission of synchronization adjustment data SAD need only be arranged to occur once per M frames (M being an integer equal to or greater than 1).

FIGS. 4(*a*) to 4(*g*) and 5(*a*) to 5(*g*) show the case in which the first frame interval v1 is va.

In FIG. 4(*a*), among the frame synchronization signals SYf, the signals generated for individual frames are indicated by reference characters t1 to t6; in FIG. 4(*c*), among the synchronization adjustment signals SAS, signals generated at particular timings are indicated by reference characters s1 to s6; in FIGS. 4(*d*) and 4(*e*), among the vertical synchronization signals HCv, signals generated at particular timings are indicated by reference characters h1 to h6. Similarly, in FIG. 5(*a*), among the frame synchronization signals SYf, the signals generated for individual frames are indicated by reference characters t1 to t5; in FIG. 5(c), among the synchronization adjustment signals SAS, signals generated at particular timings are indicated by reference characters s1 to s5; in FIGS. 5(d) and 5(e), among the vertical synchronization signals HCv, signals generated at particular timings are indicated by reference characters h0 to h5.

FIGS. 20(a) to 20(e) and 21(a) to 21(e) respectively illustrate the relationships between the phase difference tolerance range RPD and the count value CT given by the cyclic counter 93 in the first frame interval and before and after that period in FIGS. 4(a) to 4(g) and 5(a) to 5(g). The cyclic counter 93 is used to count the number of local clocks LCK from a reset by the vertical synchronization signal HCv until detection of the next synchronization adjustment signal SAS. The cyclic counter 93 need not necessarily be reset at each vertical synchronization signal HCv; generally speaking, it need only be reset at intervals of T (equal to M times the period of the vertical synchronization signal HCv (M being an integer equal to or greater than 1)).

In FIGS. 20(a) to 20(e) and 21(a) to 21(e), the frame synchronization signals SYf, synchronization adjustment data SAD, and unadjusted vertical synchronization signal HCv shown in FIGS. 4(a) to 4(g) and FIGS. 5(a) to 5(g) are omitted, and the synchronization adjustment signals SAS, phase-adjusted vertical synchronization signals HCv, phase difference tolerance range RPD, and count value CT are shown.

The phase tolerance range RPD consists of prescribed time spans preceding and following the vertical synchronization signal HCv; the values A and B defining the phase tolerance range RPD are set with allowance for transmission delay fluctuations in the network. Since the network itself produces varying transmission delays and clock synchronization using NTP has a tolerance of a few milliseconds, it makes no sense to perform adjustments with greater precision than that.

FIGS. 4(a) to 4(g) illustrate the case in which the unadjusted vertical synchronization signals HCv (h1 to h6) lead the synchronization adjustment signals SAS (s1 to s6) and (the absolute value of) the phase difference is d1.

It is assumed that for the first frame, the transmitting apparatus TA and display device HS-n both have the same frame length v1 (=va).

First, at time t1, the control signal generation means 90 calculates the phase difference d1 between the synchronization adjustment signal SAS (s1) output from the synchronization adjustment signal generation means 63 and the vertical synchronization signal HCv (h1). Specifically, it resets the cyclic counter 93 at the vertical synchronization signal HCv (h1) immediately before time t1, counts the number of subsequent local clocks LCK, and calculates the phase difference between the synchronization adjustment signal SAS (s1) and vertical synchronization signal HCv (h1) from the value of the count CTs when it receives the synchronization adjustment signal SAS (s1). If the calculated phase difference is outside the phase difference tolerance range RPD (d1 is outside the tolerance range RPD centered on the occurrence timing of the vertical synchronization signal HCv (h1) immediately before time t1), it decides that the synchronization adjustment signal SAS lags the vertical synchronization signal HCv by an excessive amount, or conversely, that the phase of the vertical synchronization signal HCv leads the phase of the synchronization adjustment signal SAS by an excessive amount, and makes the length v2 of the next frame (from h2 to h3) longer than the length v1 of the current frame (lengthens the interval between occurrences of the vertical synchronization signal HCv). This can be done by reducing the frequency of the local clock LCK. When the local clock generation means 10 is configured as a voltage controlled oscillator (VCXO), the frequency of the local clock LCK can be reduced by reducing the applied control voltage.

The amount of lengthening (adjustment width) of the occurrence intervals THCv (v1, v2, v3, . . . ) of the vertical synchronization signal HCv may be a predetermined value or may be determined according to the detected phase difference (e.g., increased as the phase difference increases).

Similarly, at time t2, the phase difference between the synchronization adjustment signal SAS (s2) and vertical synchronization signal HCv (h2) is calculated, and if the vertical synchronization signal HCv (h2) still leads the synchronization adjustment signal SAS (s2) and the (adjusted) phase difference dim is still found to be outside the phase difference tolerance range RPD, the length v3 of the next frame (from h3 to h4) is made longer than v2.

Similarly, at time t3, the phase difference between the synchronization adjustment signal SAS (s3) and vertical synchronization signal HCv (h3) is calculated, and if the vertical synchronization signal HCv (h3) still leads the synchronization adjustment signal SAS (s3) and the (adjusted) phase difference dim is still found to be outside the phase difference tolerance range RPD, the length v4 of the next frame (from h4 to h5) is made longer than v3.

At time t4, the phase difference between the synchronization adjustment signal SAS (s4) and vertical synchronization signal HCv (h4) is calculated, and if the (adjusted) phase difference dim is found to be within the phase difference tolerance range RPD, the length v4 of the next frame (from h5 to h6) is left unchanged (the same as in the previous frame).

After that, as long as the phase difference between the synchronization adjustment signal SAS and the vertical synchronization signal HCv is within the phase difference tolerance range RPD, the frame length is kept at v4 (>v1), and as a result, the phase of the vertical synchronization signal HCv gradually retreats with respect to the phase of the synchronization adjustment signal SAS (changes in the lagging direction).

FIGS. 5(a) to 5(g) illustrate the case in which the unadjusted vertical synchronization signals HCv (h0 to h5) lag the synchronization adjustment signals SAS (s1 to s5) and (the absolute value of) the phase difference is d2.

It is assumed that for the first frame, the transmitting apparatus TA and display device HS-n both have the same frame length v1 (=va).

First, at time t1, the control signal generation means 90 calculates the phase difference d1 between the synchronization adjustment signal SAS (s1) output from the synchronization adjustment signal generation means 63 and the vertical synchronization signal HCv (h1). Specifically, it resets the cyclic counter 93 at the vertical synchronization signal HCv (h0) immediately before time t1, counts the number of subsequent local clocks LCK, and calculates the phase difference between the synchronization adjustment signal SAS (s1) and vertical synchronization signal HCv (h1) from the value of the count CTs when it receives the synchronization adjustment signal SAS (s1). If the calculated phase difference is outside the phase difference tolerance range RPD (d2 is outside the tolerance range RPD centered on the next occurrence timing of the vertical synchronization signal HCv (h1) after time t1), it decides that the synchronization adjustment signal SAS leads the vertical synchronization signal HCv by an excessive amount, i.e., that the phase of the vertical synchronization signal HCv lags the synchronization adjustment signal SAS an excessive amount, and makes the length v2 of the next frame (from h1 to h2) shorter than the length v1 of the current frame (shortens the interval between occurrences of the vertical synchronization signal HCv). This can be done by increasing the frequency of the local clock LCK. When the local clock generation means 10 is configured as a voltage controlled oscillator (VCXO), the frequency of the local clock LCK can be increased by increasing the applied control voltage.

The amount of the reduction (the adjustment width) may be a predetermined value or may be determined according to the detected phase difference (e.g., increased as the phase difference increases).

Similarly, at time t2, the phase difference between the synchronization adjustment signal SAS (s2) and vertical synchronization signal HCv (h2) is calculated, and if the vertical synchronization signal HCv (h2) still lags the synchronization adjustment signal SAS (s2) and the (adjusted) phase difference d2$m$ is still found to be outside the phase difference tolerance range RPD, the length v3 of the next frame (from h2 to h3) is made shorter than v2.

Similarly, at time t3, the phase difference between the synchronization adjustment signal SAS (s3) and vertical synchronization signal HCv (h3) is calculated, and if the vertical synchronization signal HCv (h3) still lags the synchronization adjustment signal SAS (s3) and the (adjusted) phase difference d2$m$ is still found to be outside the phase difference tolerance range RPD, the length v4 of the next frame (from h3 to h4) is made shorter than v3.

At time t4, the phase difference between the synchronization adjustment signal SAS (s4) and vertical synchronization signal HCv (h4) is calculated, and if the (adjusted) phase difference d2$m$ is found to be within the phase difference tolerance range RPD, the length v4 of the next frame (from h4 to h5) is left unchanged (the same as in the previous frame).

After that, as long as the phase difference between the synchronization adjustment signal SAS and the vertical synchronization signal HCv is within the phase difference tolerance range RPD, the frame length is kept at v4 (<v1), and as a result, the phase of the vertical synchronization signal HCv gradually advances with respect to the phase of the synchronization adjustment signal SAS (changes in the leading direction).

As described above, it is possible to limit the phase difference between the vertical synchronization signal HCv and the synchronization adjustment signal SAS to within a prescribed range (within the phase difference tolerance range RPD) by delaying the occurrence of the vertical synchronization signal HCv when the phase of the vertical synchronization signal HCv leads the phase of the synchronization adjustment signal SAS, and conversely, by advancing the occurrence of the vertical synchronization signal HCv when the phase of the vertical synchronization signal HCv lags the phase of the synchronization adjustment signal SAS.

As described above, in the examples shown in FIGS. 4(*a*) to 4(*g*) and 5(*a*) to 5(*g*), whether or not the calculated phase difference is within the tolerance range RPD is determined from whether or not the count value CTs of the cyclic counter 93 when the display device HS-n receives the synchronization adjustment signal SAS satisfies $$F-B \leq CTs \quad \text{(F10)}$$

or $$CTs \leq A \quad \text{(F11)}$$

If inequality (F10) or (F11) is satisfied, it is decided that the phase difference is within the tolerance range RPD; otherwise, it is decided that the phase difference is outside the tolerance range RPD.

F is here the total number of local clocks (LCK) generated in one frame interval, and A and B are positive integers not exceeding 0.5×F; specifically, A and B are set at values of about ⅛ to ¼ of F. That is, A and B are set at count values corresponding to the lengths At and Bt, which are ⅛ to ¼ of the length of a frame. The set values of A and B are stored in each display device HS-n: for example, in its image reproduction/updating control means 7.

In general, the period T need only be M times the period of the vertical synchronization signal HCv, in which case F is the total number of local clocks (LCK) generated in M frame intervals, and A and B are determined as count values corresponding to the At and Bt intervals in M frame intervals.

The phase difference tolerance range is not limited to the above, but may be determined according to the frame rate of video images displayed on the display devices or the network transmission delay.

If the condition $$0.5 \times F < CTs < F-B \quad \text{(F12)}$$

is satisfied, it is decided that the phase difference is outside the tolerance range RPD and the vertical synchronization signals HCv lag the synchronization adjustment signals SAS; if the condition $$A < CTs < 0.5 \times F \quad \text{(F13)}$$

is satisfied, it is decided that the phase difference is outside the tolerance range RPD and the vertical synchronization signals HCv lead the synchronization adjustment signals SAS.

Each of the first to N-th display devices HS-1 to HS-N can use the synchronization adjustment data SAD generated by the system master clock 1 in the transmitting apparatus TA to keep the image update timings of the image display means 8 (vertical synchronization signals HCv) within a fixed phase difference range of the synchronization adjustment signals SAS output from the synchronization adjustment signal generation means 63 in the data reception means 6, with the result that the image update timings among the image display means 8 in the first to N-th display devices HS-1 to HS-N can also be kept within a fixed phase difference range. If the image update timing in each display device HS-n is controlled with the goal of keeping it within the tolerance range RPD (within ±HRP), the phase difference between the image update timings of any two display devices will be kept within the tolerance range RPD (within twice HRP).

In FIGS. 4(*a*) to 4(*g*) and 5(*a*) to 5(*g*), the result of the calculation of the phase difference between the synchronization adjustment signal SAS and vertical synchronization signal HCv is directly reflected in the next frame; an alternative scheme that may be used is to increase or decrease the phase difference when the average phase difference in a given period (the average over a prescribed number of frames) goes outside the phase difference tolerance range or when a given number of consecutive phase differences are outside the phase difference tolerance range and have the same positive/negative sign.

If the data transmission means 4 shifts the transmission timings irregularly to avoid transmission delays and delay variations due to traffic congestion, it may also transmit transmission time difference information TDD indicating the difference from the regular timing. If the transmission time difference information TDD is added, a variation similar to that described with reference to FIGS. 8(*a*) to 13(*h*) in relation to the first embodiment can be added.

If, due to delays from the output of the information or signal indicating time from the system master clock 1 up to the creation of synchronization adjustment data SAD in the data generation means 3 in the transmitting apparatus TA, the transmission of the synchronization adjustment data SAD from the data transmission means 4 in the transmitting apparatus TA to the data reception means 6 in each display device HS-n, and the generation of a synchronization adjustment signal SAS from the synchronization adjustment data SAD in the synchronization adjustment signal generation means 63 of each display device HS-n, the value indicating the phase difference obtained by comparing the vertical synchronization signal HCv and the synchronization adjustment signal SAS exceeds a prescribed value, the value indicating the phase difference obtained in this way may be treated as invalid (unreliable) and not used to alter the clock frequency.

Possible transmission delays in the transmission of synchronization adjustment data SAD from the data transmission means 4 in the transmitting apparatus TA to the data reception means 6 in each display device HS-n include delays due to traffic congestion in the network NW; possible delays in the generation of the synchronization adjustment signal SAS from the synchronization adjustment data SAD in the synchronization adjustment signal generation means 63 in each display device HS-n include delays in the process of generating the synchronization adjustment signal SAS caused by internal processing load conditions (e.g., storing the image data (with reproduction control information) VCD input from input terminal 9 in the buffer control means 61 and the decoding process in the decoding processing means 72); these delays differ among the display devices and also vary over time.

In the examples shown in FIGS. 4(*a*) to 4(*g*) and 5(*a*) to 5(*g*), first, depending on whether the count value CTs of the cyclic counter 93 when the n-th display device HS-n receives the synchronization adjustment signal SAS satisfies $$F-Bm \leq CTs \tag{F14}$$

or $$CTs \leq Am \tag{F15},$$

whether or not the calculated phase difference is within the valid synchronization adjustment signal range VLD shown in FIGS. 4(*e*) and 5(*e*) is determined. Am and Bm are count values satisfying the conditions Am>A and Bm>B.

If inequality (F14) or (F15) is satisfied, it is decided that the phase difference is within the valid range VLD of the synchronization adjustment signal; otherwise, it is decided that the phase difference is outside the valid range VLD of the synchronization adjustment signal.

The valid range VLD of the synchronization adjustment signal consists of prescribed time spans preceding and following the vertical synchronization signal HCv; the values Am and Bm defining the valid range VLD of the synchronization adjustment signal are set with allowance for transmission delay fluctuations in the network and other factors.

Accordingly, from inequalities (F12) and (F13), when the display device HS-n receives a synchronization adjustment signal SAS, the control signal generation means 90 decides that it is a valid synchronization adjustment signal SAS if the value of the count CTs of the cyclic counter 93 satisfies the condition $$F-Bm \leq CTs < F-B \tag{F16}$$

or $$A < CTs \leq Am \tag{F17}$$

When inequality (F16) is satisfied, it is decided that the phase difference is outside the tolerance range RPD but inside the valid range VLD of the synchronization adjustment signal and that the vertical synchronization signal HCv lags the synchronization adjustment signal SAS; when inequality (F17) is satisfied, it is decided that the phase difference is outside the tolerance range RPD but inside the valid range VLD of the synchronization adjustment signal and that the vertical synchronization signal HCv leads the synchronization adjustment signal SAS; processing proceeds accordingly.

Conversely, if $$0.5 \times F < CTs < F-Bm \tag{F18}$$

$$Am < CTs < 0.5 \times F \tag{F19}$$

the control signal generation means 90 decides that the synchronization adjustment signal SAS includes a delay that makes it invalid for synchronization adjustment, and does not use it in generating the local clock control signal LCKCS in the local clock control means 94.

Depending on the phase difference between the synchronization adjustment signal SAS and the vertical synchronization signals HCv, if the phase of the vertical synchronization signal HCv leads the synchronization adjustment signals SAS, the local clock control means 94 delays the generation of the vertical synchronization signal HCv, and conversely, if the phase of the vertical synchronization signal HCv lags the phase of the synchronization adjustment signals SAS, it advances the generation of the vertical synchronization signal HCv, thereby performing control that keeps the vertical synchronization signal HCv and synchronization adjustment signal SAS within a fixed phase difference (within the phase difference tolerance range RPD).

Frequency control when the local clock generation means 10 is configured as a voltage controlled oscillator (VCXO) will be described below. By increasing or decreasing the voltage applied to a voltage controlled oscillator (VCXO), thereby varying the capacitance of a variable capacitance element therein and, as a result, adjusting the oscillation frequency of the reference clock (local clock) generated by the local clock generation means 10, it is possible to control the oscillation frequency so that it matches the frequency of the reference clock in the transmitting apparatus TA. The higher the control voltage is, the higher the frequency of the reference clock LCK becomes.

Within the voltage controlled oscillator (VCXO), however, the frequency of the reference clock is controlled by the analog value of the control voltage applied to the voltage controlled oscillator (VCXO), so that it varies constantly due to power-supply noise and voltage drops due to processing load. Also, with regard to the phase difference between the synchronization adjustment signal SAS and vertical synchronization signal HCv, which determines the control voltage, there are variations in the generation of the synchronization adjustment signals SAS depending on the internal processing load status in each of the first display device HS-1 to the N-th display device HS-N, making it unsuitable for stable synchronization control, so that, when the synchronization adjustment signal is outside its valid range VLD, the corresponding frequency change (the change of the control voltage for that purpose) is not carried out. As a result, the frequency of the reference clock (LCK) is kept at its existing value.

To prevent the frequency from wandering greatly while out of effective control, upper and lower limit values of the control voltage applied to the voltage controlled oscillator (VCXO) are set and the control voltage is not allowed to become higher than the upper limit value or lower than the lower limit value. The frequency of the local clock when the control voltage has the upper limit value is referred to as the maximum frequency, and the frequency of the local clock when the control voltage has the lower limit value is referred to as the minimum frequency.

For the purpose of performing stable operation despite the constantly varying control voltage of the voltage controlled oscillator (VCXO), the maximum value and minimum value of the control voltage are calculated by using a period of light internal processing load (software processing and data transfer processing load) (a period of small variation in the processing time for generating the synchronization adjustment signals SAS), for example, a given period preceding the image reproduction/update process, to find the range of variation of the control voltage in a quasi-stationary state under current conditions, and the upper limit value and lower limit value are set on the basis of these maximum and minimum values so as to satisfy the condition $$FHmin < FTref < FHmax \tag{F20}$$

(where FTref indicates the frequency of the reference clock of the transmitting apparatus TA, FHmin indicates the minimum local clock frequency, and FHmax indicates the maximum local clock frequency). After that, even if there is a period of time in which the internal processing load (software processing and data transfer processing load) becomes heavy, the delay in the time of generation of the synchronization adjustment signal SAS cannot be ignored, the synchronization adjustment signal goes outside its valid range VLD, and the phase difference between the synchronization adjustment signal SAS and the vertical synchronization signal HCv cannot be reflected in the change in the control voltage (to do so would be inappropriate), it is still possible to keep the control voltage within the range from its lower limit value to its upper limit value so that the frequency of the reference clock (local clock) does not wander greatly.

Initial values of the upper limit value and lower limit value of the control voltage are determined according to the operation at the time of start-up of the display device.

The start-up operation of the display device will be described below.

FIGS. 22(a) to 22(d) respectively illustrate the synchronization adjustment data SAD, valid synchronization adjustment signals SAS, local clock control signal LCKCS (when the local clock generation means 10 is a voltage controlled oscillator (VCXO) this corresponds to the control voltage), and phase difference (denoted DIF) between the synchronization adjustment signal SAS and vertical synchronization signal HCv. The n-th display device HS-n starts up at time T0, enters the quasi-stationary state at time T1, enters the image reproduction/update processing ready state at time T2, and starts image reproduction/update processing at time T3.

Immediately after the start-up of the n-th display device HS-n (at time T0), the image display control signal generation means 92 generates vertical synchronization signals HCv in synchronization with the synchronization adjustment signals SAS. Accordingly, at time T, there is no phase difference between the synchronization adjustment signal SAS and the vertical synchronization signal HCv. At the same time, at time T0, the cyclic counter 93 also begins to operate and counts repeatedly in cycles of T (T being a positive real number). In this case, the cycle T is set equal to (the fixed value preset as) the period of the synchronization adjustment data SAD (or the synchronization adjustment signal SAS).

The local clock control means 94 generates the local clock control signal LCKCS on the basis of the count value CTs of the cyclic counter 93 when the synchronization adjustment signal SAS input via input terminal 97 is received, and outputs the generated signal to the local clock generation means 10, thereby controlling the frequency of the reference clock LCK. The method is the same as the method, described using FIGS. 20(a) to 20(e) and FIGS. 21(a) to 21(e), by which the local clock control signal LCKCS is generated from the phase difference between the synchronization adjustment signal SAS and the vertical synchronization signal HCv.

The maximum value VMAX and minimum value VMIN of the control voltage of the local clock control signal LCKCS are calculated within a fixed time interval (the interval from T1 to T2) from the time T1 at which the local clock control means 94 enters the quasi-stationary state, a fixed length of time after start-up. The term 'quasi-stationary state' as used herein means a state in which the count values CTs output by the cyclic counter 93 each time a synchronization adjustment signal SAS is received have stopped increasing or decreasing in a continuous monotonic fashion and have substantially converged, varying only within a fixed range (within the range from the minimum value to the maximum value), indicating that the difference between the period of the synchronization adjustment data SAD generated from the reference clock of the transmitting apparatus TA (and the synchronization adjustment signal SAS generated therefrom) and the period T (a period obtained simply by counting CTc reference clocks LCK, where CTc is preset as a value corresponding to the period T) generated from the reference clock (local clock) LCK of the relevant display device HS-n has settled down to a predetermined value or less and as a result, the phase difference (DIF) between the synchronization adjustment signal SAS and the vertical synchronization signal HCv has converged onto a fixed value. This indicates that the difference between the reference clocks of the transmitting apparatus TA and the n-th display device HS-n has settled into a fixed range, meaning that synchronization has been acquired. Accordingly, after time T2 (the point at which convergence is confirmed), image reproduction/update processing synchronized with the reference clock of the transmitting apparatus TA is possible.

At time T2, the local clock control means 94 outputs a clock ready signal CKRDY to the image display control signal generation means 92 to cause it to output image display control signals HC.

If the timing (phase) for generating the image display control signals HC can be switched at time T2 without problem, the output of the clock ready signal CKRDY may start before then.

After time T2, the decoding process control signal generation means 91 outputs a decoding process control signal DCS via the output terminal 95 to the decoding processing means 72, where the decoding process is started, and to the image display control signal generation means 92.

The image display control signal generation means 92 initializes the timing of generation of the vertical synchronization signals HCv (to synchronize them with the synchronization adjustment signals SAS) responsive to the clock ready signal CKRDY input from the local clock control means 94, thereby limiting the phase differences from the synchronization adjustment signals SAS to values equal to or less than a prescribed value. The timing of generation of the vertical synchronization signals HCv need not necessarily be initialized; if it is not initialized, the phase difference from the synchronization adjustment signal SAS may be gradually reduced to a value equal to or less than the prescribed value.

The operation in the image reproduction/update processing state after time T3 is as described above with reference to FIGS. 4(a) to 4(g) and 5(a) to 5(g). At this time, the cyclic counter 93 is reset every period T, and counts the number of local clocks LCK. In FIGS. 4(a) to 4(g) and 5(a) to 5(g), the period T of the cyclic counter 93 is assumed to be equal to the period of the vertical synchronization signal HCv, but this is not a limitation. In general, the period T of the cyclic counter 93 need only be set at M times the period of the vertical synchronization signal HCv and adjusted once per M periods (M being a positive integer).

Based on the maximum value VMAX and the minimum value VMIN obtained by the above-described process, an upper limit value VUL and lower limit value VLL are set. For example, the upper limit value VUL and lower limit value VLL may be set equal to the maximum value VMAX and minimum value VMIN, or may be set to values with a slight extra margin (a value greater than the maximum value VMAX by an extra margin amount and a value less than the minimum value VMIN by an extra margin amount).

Next, the process of updating the upper limit value VUL and lower limit value VLL of the control voltage after the end of the display device start-up process will be described.

When a voltage control crystal oscillator (VCXO) is used as the local clock generation means 10, for example, the oscillation frequency varies daily or hourly due to temperature changes, humidity changes, aging changes, or the like. Accordingly, if the upper limit value VUL and lower limit value VLL determined at the start-up time of the n-th display device HS-n are held fixed, after a long period of continuous operation, expression (F20) may no longer be satisfied.

For example, when the control voltage is at the upper limit value VUL, the reference clock (local clock) of the n-th display device HS-n lags the reference clock of the transmitting apparatus TA, and accordingly the frequency of the local clock must be increased further, if the control voltage cannot be made greater than the upper limit value VUL, the lag of the vertical synchronization signals HCv with respect to the synchronization adjustment signal gradually increases, leading to a state in which inequality (F18) is satisfied; as a result, it is decided that the synchronization adjustment signal SAS is invalid, and if this state continues, synchronization between the transmitting apparatus TA and the n-th display device HS-n is lost. Therefore, when inequality (F18) is satisfied consecutively a prescribed number of times or more, and accordingly expression (F18) is satisfied continuously for a prescribed period of time or longer, the upper limit value VUL is increased. This makes it possible to increase the maximum frequency of the local clock and satisfy expression (F20).

Similarly, when the control voltage is at the lower limit value, the reference clock (local clock) of the n-th display device HS-n leads the reference clock of the transmitting apparatus TA, and accordingly the frequency of the local clock must be decreased further, if the control voltage cannot be made less than the lower limit value VLL, the amount by which the vertical synchronization signals HCv leads the synchronization adjustment signal gradually increases, leading to a state in which inequality (F19) is satisfied; as a result, it is decided that the synchronization adjustment signal SAS is invalid, and if this state continues, synchronization between the transmitting apparatus TA and the n-th display device HS-n is lost. Therefore, when inequality (F19) is satisfied consecutively a prescribed number of times or more, and accordingly expression (F19) is satisfied continuously for a prescribed period of time or longer, the lower limit value VLL is decreased. This makes it possible to decrease the minimum frequency of the local clock and satisfy expression (F20).

As described above, the reference clocks of the transmitting apparatus TA and the n-th display device HS-n can be synchronized within a fixed error range by processing based on the phase difference between the period of the synchronization adjustment data SAD (the synchronization adjustment signal SAS) based on the reference clock of the transmitting apparatus TA and the period T based on the reference clock of the n-th display device HS-n (or the period of the vertical synchronization signal HCv), and the screen update timing (vertical synchronization signal HCv) of the n-th display device HS-n can be synchronized with the timing of the synchronization adjustment data SAD generated in the transmitting apparatus TA within a tolerance range RPD. As a result, the screen update timings of the first display device HS-1 to the N-th display device HS-N can be synchronized within the tolerance range RPD.

If the generation of a synchronization adjustment signal SAS is delayed due to internal processing load conditions in the n-th display device HS-n, the local clock control means 94 treats the synchronization adjustment signal SAS as invalid, preventing a worsening of the phase difference (in the screen update timing).

With regard to the local clock control signal LCKCS for controlling the local clock generation means 10, the maximum value VMAX and minimum value VMIN of the control voltage are calculated from the range of variation in the quasi-stationary state, and an upper limit value VUL and a lower limit value VLL are set according to the maximum value and the minimum value, so that, even if the generation of the synchronization adjustment signal SAS is delayed due to internal load and the synchronization adjustment signal SAS is treated as invalid, resulting in occurrence of a period of time during which the local clock cannot be controlled, the phase difference (in screen update timing) will not be drastically worsened.

In addition, if the synchronization adjustment signal SAS does not fall within the prescribed range a fixed number or more of consecutive times, the upper limit value VUL or lower limit value VLL of the local clock control signal LCKCS for controlling the local clock generation means 10 is changed (whichever one of the upper limit value VUL and the lower limit value VLL is controlling the local clock control signal LCKCS is changed), so that, stable synchronization can be maintained even over long-term continuous operation.

Since the phase difference tolerance range RPD is set with an allowance for transmission delay variations on the network and the local clock control signal LCKCS is not changed when the synchronization adjustment signal SAS is within the phase difference tolerance range RPD, excessive response of the local clock LCK to the synchronization adjustment signal SAS can be prevented and stable behavior can be achieved.

The third embodiment has been described on the assumption that a synchronization adjustment signal SAS is generated in the synchronization adjustment signal generation means 63 in display device HS-n every time synchronization adjustment data SAD are supplied (accordingly, once per frame), but this is not a limitation; synchronization adjustment signal SAS may be generated less frequently than the synchronization adjustment data SAD are supplied.

For example, when the local clock generation means 10 is configured as a voltage controlled oscillator (VCXO), the synchronization adjustment signal SAS may be generated less frequently in consideration of the time taken for the local clock frequency to stabilize after the applied control voltage is changed.

For example, a synchronization adjustment signal SAS may be generated each time synchronization adjustment data SAD have been supplied a prescribed number of times, equal to two times or more.

In the transmitting apparatus TA, synchronization adjustment data SAD may be generated once per multiple frames in the data generation means 3, for example, instead of once per frame, or may be transmitted once per multiple frames in the data transmission means 4, for example, instead of being transmitted once per frame. If one transmission takes place per multiple frames, the synchronization adjustment signal generation means 63 in display device HS-n may generate a synchronization adjustment signal SAS for each frame from the synchronization adjustment data SAD transmitted once per multiple frames.

The phase difference between the synchronization adjustment signal SAS and the vertical synchronization signal HCv may be detected (and the phase of the vertical synchronization signal HCv adjusted on the basis of the detection result) at a plural multiple of the interval between the vertical synchronization signals HCv. The interval equal to a plural multiple of the interval between vertical adjustment signals HCv may be the interval at which the synchronization adjustment signal SAS is generated, the synchronization adjustment signal SAS then being generated less frequently than the vertical synchronization signal HCv.

To generalize, detection of the phase difference between the synchronization adjustment signal SAS and vertical synchronization signal HCv may be performed with a period of M times the period of the vertical synchronization signal HCv (M being 1 or a greater integer). When M is 2 or greater, the phase difference between the every M-th vertical synchronization signal HCv and the synchronization adjustment signal SAS is detected.

For example, the period at which the phase difference is detected by comparison of the synchronization adjustment signal SAS with the vertical synchronization signal HCv and the control voltage is controlled on the basis of the detection result can be set to one second by setting M to 30 when the vertical synchronization signal HCv is generated at intervals of 1/30 second and setting M to at 60 when the vertical synchronization signal HCv is generated at intervals of 1/60 second.

When the synchronization adjustment signal SAS is generated at intervals equal to M times the interval at which the vertical synchronization signal HCv is generated, every M-th vertical synchronization signal HCv is used for comparison with the phase of the synchronization adjustment signal SAS.

By having the synchronization adjustment data SAD generated at intervals equal to a plural multiple of the interval at which the vertical synchronization signal HCv is generated, the frequency of the processing for generating and transmitting synchronization adjustment data SAD based on the reference clock of the transmitting apparatus TA and the frequency of the processing for receiving the synchronization adjustment data SAD in the n-th display device HS-n can be reduced, whereby the processing load can be lightened.

The period length of the cyclic counter 93 before the image reproduction/update process is changed during and after the image reproduction/update processing ready state, but this change of the period is not absolutely necessary; starting before the image reproduction/update processing ready state, vertical synchronization signals HCv may be generated internally and the processing of their phase differences from the synchronization adjustment signal SAS may be carried out.

REFERENCE CHARACTERS 1 system master clock, 2 storage means, 3 data generation means, 4 data transmission means, 5, 5a, 5b output terminal, 6 data reception means, 6a image data reception means, 6b synchronization adjustment data reception means, 7 image reproduction/updating control means, 8 image display means, 61 buffer control means, 62 receive buffer, 63 synchronization adjustment signal generation means, 71 control signal generation means, 72 decoding processing means, 73 memory control means, 74 memory, 90 control signal generation means, 91 decoding process control signal generation means, 92 image display control signal generation means, 93 cyclic counter, 94 local clock control means, TA transmitting apparatus, HS-1 first display device, HS-n n-th display device, HS-N N-th display device, NW, Nwa, NWb network.

What is claimed is:

1. A multi-screen display system in which a transmitting apparatus and a plurality of display devices are interconnected via a network, wherein:
   the transmitting apparatus comprises
   a system master clock configured to generate a reference clock time of the system,
   a storage unit configured to store image data,
   a data generation unit configured to generate reproduction control information from the reference clock time generated by the system master clock and to add the reproduction control information to image data read from the storage unit, thereby generating image data with reproduction control information, and to generate synchronization adjustment data for adjusting a reproduced image update timing from the reference clock time generated by the system master clock, and
   a data transmission unit configured to transmit the image data with reproduction control information and the synchronization adjustment data;
   each of the plurality of display devices includes
   a data reception unit configured to receive the image data with reproduction control information and the synchronization adjustment data transmitted from the data transmission means in the transmitting apparatus, and to generate a synchronization adjustment signal from the synchronization adjustment data,
   an image reproduction/updating control unit configured to perform an image reproduction/update process based on the reproduction control information included in the image data with reproduction control information received by the data reception unit, and the synchronization adjustment signal, thereby outputting a reproduced image, and to generate an image display control signal for deciding an image update timing, and
   an image display unit configured to display the reproduced image output from the image reproduction/updating control unit at a timing of the image display control signal; and
   the image reproduction/updating control unit increases and decreases subsequent periods of the image display control signal according to a phase difference between the synchronization adjustment signal output from the data reception unit and the image display control signal output to the image display unit, controlling the periods so as to reduce the phase difference, thereby synchronizing image update timings among the plurality of display devices.

2. The multi-screen display system of claim 1, wherein the image display control signal includes at least one of a vertical synchronization signal and a horizontal synchronization signal.

3. The multi-screen display system of claim 2, wherein:
each of the display devices includes a local clock generation configured to generate a local clock; and
the image reproduction/updating control unit of each of the display devices generates the image display control signal on a basis of the local clock generated by the local clock generation unit in the display device.

4. The multi-screen display system of claim 3, wherein the image reproduction/updating control unit increases and decreases a frequency of the local clock, thereby increasing and decreasing the period of the image display control signal.

5. The multi-screen display system of claim 4, wherein the image reproduction/updating control unit in each of the display devices includes:
a cyclic counter for counting the local clock generated by the local clock generation unit in the display device; and
a local clock control configured to control the local clock generation unit; and wherein
the local clock control unit determines the clock phase difference between the transmitting apparatus and the display device from the count value of the local clock control unit at the time of input of the synchronization adjustment signal, and controls the frequency of the local clock.

6. The multi-screen display system of claim 5, wherein:
the local clock generation unit includes a voltage controlled oscillator having an oscillation frequency that can be increased and decreased by increasing and decreasing a control voltage; and
the local clock control unit increases and decreases the control voltage supplied to the voltage controlled oscillator, thereby increasing or decreasing the frequency.

7. The multi-screen display system of claim 6, wherein in a given period of time before the image reproduction/update process, the local clock control unit determines a maximum value and a minimum value of the control voltage of the voltage controlled oscillator from count values of the cyclic counter at times of input of the synchronization adjustment signal, defines an upper limit value and a lower limit value of the control voltage based on the maximum value and the minimum value, and performs control to prevent the control voltage from falling below the lower limit value or rising above the upper limit value during the image reproduction/update process.

8. The multi-screen display system of claim 3, wherein the period of the image display control signal is increased and decreased by increasing or decreasing the number of local clocks generated in each period of the image display control signal for each of the display devices.

9. The multi-screen display system of claim 8, wherein increasing or decreasing of the number of clocks generated in each period of the image display control signal is carried out by increasing or decreasing the number of clocks corresponding to a number of non-effective pixels in a horizontal blanking interval or a number of non-effective lines in a vertical blanking interval.

10. The multi-screen display system of claim 1, wherein:
the image display control signal includes a vertical synchronization signal;
when the vertical synchronization signal leads the synchronization adjustment signal by a value equal to or greater than a first prescribed value, the image reproduction/updating control unit increases the period of the image display control signal; and
when the vertical synchronization signal lags the synchronization adjustment signal by a value equal to or greater than a second prescribed value, the image reproduction/updating control unit decreases the period of the image display control signal.

11. The multi-screen display system of claim 10, wherein the first prescribed value and the second prescribed value correspond to an amount of variation in network delay occurring between the transmitting apparatus and each of the display devices.

12. The multi-screen display system of claim 5, wherein the local clock control unit does not change the control voltage when the absolute value of the phase difference between the synchronization adjustment signal and the vertical synchronization signal is equal to or greater than a third prescribed value greater than the first prescribed value.

13. The multi-screen display system of claim 12, wherein:
at a time of performing an image reproduction/update process,
if the vertical synchronization signal consecutively leads the synchronization adjustment signal by a value equal to or greater than the third prescribed value for a period of time equal to or longer than a given time, the local clock control unit corrects the lower limit value of the control voltage for the voltage controlled oscillator to a lower value;
if the vertical synchronization signal consecutively lags the synchronization adjustment signal by a value equal to or greater than the fourth prescribed value for a period of time equal to or longer than the given time, the local clock control unit corrects the upper limit value of the control voltage for the voltage controlled oscillator to a greater value.

14. The multi-screen display system of claim 13, wherein the third prescribed value and the fourth prescribed value correspond to variations in network delay occurring between the transmitting apparatus and each of the display devices.

15. The multi-screen display system of claim 8, wherein:
the transmitting apparatus transmits time information from the system master clock;
each of the display devices includes a local clock generation unit configured to generate a clock; and
the local clock generation unit synchronizes the frequency of the clock generated by the local clock generation unit with the frequency of the clock of the time information transmitted from the transmitting apparatus and received.

16. The multi-screen display system of claim 1, wherein:
the data reception unit includes
an image data reception unit for receiving the image data with reproduction control information transmitted from the data transmission unit in the transmitting apparatus via the network, and
a synchronization adjustment data reception configured to generate the synchronization adjustment signal from the synchronization adjustment data transmitted from the data transmission unit in the transmitting apparatus via the network; and
the image reproduction/updating control unit performs image reproduction/update processing based on the reproduction control information included in the image data with reproduction control information received by the image data reception unit and the synchronization adjustment signal generated by the synchronization adjustment data reception unit, outputs the reproduced image, and generates the image display control signal.

17. The multi-screen display system of claim 16, wherein:
each of the display devices includes a first input terminal for receiving the image data with reproduction control information transmitted from the data transmission unit in the transmitting apparatus via the network, and a second input terminal for receiving the synchronization adjustment data transmitted from the data transmission unit in the transmitting apparatus via the network;

the image data reception unit receives the image data with reproduction control information via the first input terminal; and the synchronization adjustment data reception unit receives the synchronization adjustment data via the second input terminal.

18. The multi-screen display system of claim 17, wherein:
the network includes a first network and a second network;
the image data with reproduction control information are input at the first input terminal via the first network; and
the synchronization adjustment data are input at the second input terminal via the second network.

19. The multi-screen display system of claim 1, wherein:
the data transmission unit transmits, together with the synchronization adjustment data generated in the data generation unit, transmission time difference information representing a transmission lag time up to the transmission of the synchronization adjustment data or a transmission lead time by which the transmission of the synchronization adjustment data is advanced; and
the data reception unit uses the transmission time difference information in generating the synchronization adjustment signal.

20. The multi-screen display system of claim 1, wherein each of the display devices produces a desired time difference in the image update timing among the plurality of display devices by generating the synchronization adjustment signal with a prescribed phase difference added to a timing of reception of the synchronization adjustment data in the data reception unit.

* * * * *